(12) United States Patent
Kosugi et al.

(10) Patent No.: US 7,764,345 B2
(45) Date of Patent: Jul. 27, 2010

(54) LIQUID CRYSTAL DISPLAY DEVICE INCLUDING SUB-PICTURE ELEMENTS

(75) Inventors: Shuntaro Kosugi, Yonago (JP); Tetsuya Fujikawa, Tottori (JP); Tsuyoshi Kamada, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 724 days.

(21) Appl. No.: 11/441,144

(22) Filed: May 26, 2006
(Under 37 CFR 1.47)

(65) Prior Publication Data
US 2007/0109452 A1    May 17, 2007

(30) Foreign Application Priority Data
May 30, 2005   (JP)   ............................... 2005-157641

(51) Int. Cl.
*G02F 1/1337* (2006.01)
*G02F 1/1343* (2006.01)
(52) U.S. Cl. ........................... 349/129; 349/130; 349/38
(58) Field of Classification Search ................. 349/129, 349/130, 54, 38
See application file for complete search history.

(56) References Cited

U.S. PATENT DOCUMENTS

| | | | |
|---|---|---|---|
| 4,840,460 A * | 6/1989 | Bernot et al. | 349/144 |
| 2005/0036091 A1 * | 2/2005 | Song | 349/129 |
| 2006/0103800 A1 * | 5/2006 | Li et al. | 349/129 |
| 2006/0215066 A1 * | 9/2006 | Ueda et al. | 349/38 |
| 2007/0064164 A1 * | 3/2007 | Tasaka et al. | 349/38 |
| 2007/0085955 A1 * | 4/2007 | Kimura | 349/129 |
| 2008/0273131 A1 * | 11/2008 | Kim | 349/38 |

FOREIGN PATENT DOCUMENTS

| | | |
|---|---|---|
| JP | 2002-333870 A | 11/2002 |
| JP | 2006-126842 A | 5/2006 |

* cited by examiner

*Primary Examiner*—Mike Qi
(74) *Attorney, Agent, or Firm*—Birch, Stewart, Kolasch & Birch, LLP

(57) ABSTRACT

First and second sub-picture element electrodes, a buffer capacitance, and a first to third TFTs are formed in each picture element; the first and second TFTs are driven by a signal supplied to an nth gate bus line; the third TFT is driven by a signal supplied to an (n+1)th gate bus line; the first sub-picture element electrode is connected to the first and third TFTs; the second sub-picture element electrode is connected to the second TFT; a drain electrode of the third TFT is connected to an upper electrode of the buffer capacitance; and a lower electrode of this buffer capacitance is connected to the (n+1)th gate bus line.

8 Claims, 18 Drawing Sheets

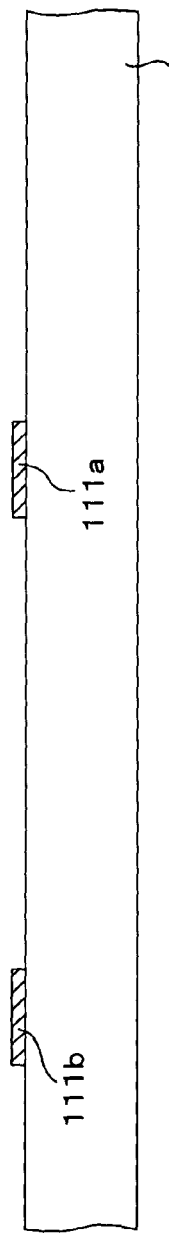
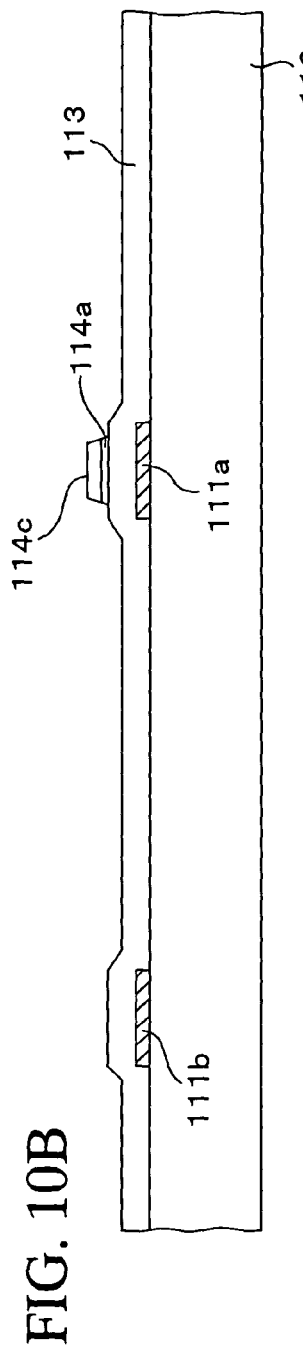
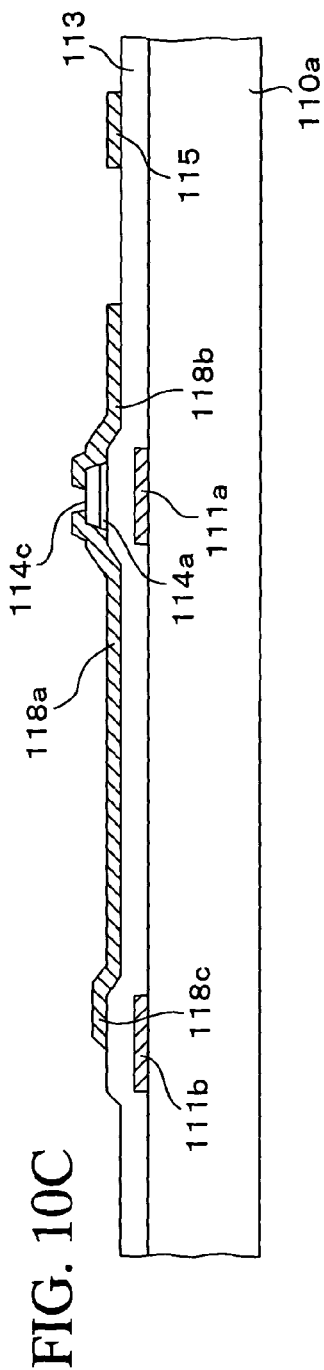
FIG. 10A
FIG. 10B
FIG. 10C

FIG. 13A

ODD FRAME

|   | 1 | 2 | 3 | 4 | ... | m | ... |
|---|---|---|---|---|-----|---|-----|
| 1 | + | + | + | + | ... | + | ... |
| 2 | − | − | − | − | ... | − | ... |
| 3 | + | + | + | + | ... | + | ... |
| 4 | − | − | − | − | ... | − | ... |
| ⋮ | ⋮ | ⋮ | ⋮ | ⋮ |     | ⋮ |     |
| n | + | + | + | + | ... | + | ... |
| ⋮ | ⋮ | ⋮ | ⋮ | ⋮ |     | ⋮ |     |

EVEN FRAME

|   | 1 | 2 | 3 | 4 | ... | m | ... |
|---|---|---|---|---|-----|---|-----|
| 1 | − | − | − | − | ... | − | ... |
| 2 | + | + | + | + | ... | + | ... |
| 3 | − | − | − | − | ... | − | ... |
| 4 | + | + | + | + | ... | + | ... |
| ⋮ | ⋮ | ⋮ | ⋮ | ⋮ |     | ⋮ |     |
| n | − | − | − | − | ... | − | ... |
| ⋮ | ⋮ | ⋮ | ⋮ | ⋮ |     | ⋮ |     |

FIG. 13B

ODD FRAME

|   | 1 | 2 | 3 | 4 | ... | m | ... |
|---|---|---|---|---|-----|---|-----|
| 1 | + | − | + | − | ... | + | ... |
| 2 | − | + | − | + | ... | − | ... |
| 3 | + | − | + | − | ... | + | ... |
| 4 | − | + | − | + | ... | − | ... |
| ⋮ | ⋮ | ⋮ | ⋮ | ⋮ |     | ⋮ |     |
| n | + | − | + | − | ... | + | ... |
| ⋮ | ⋮ | ⋮ | ⋮ | ⋮ |     | ⋮ |     |

EVEN FRAME

|   | 1 | 2 | 3 | 4 | ... | m | ... |
|---|---|---|---|---|-----|---|-----|
| 1 | − | + | − | + | ... | − | ... |
| 2 | + | − | + | − | ... | + | ... |
| 3 | − | + | − | + | ... | − | ... |
| 4 | + | − | + | − | ... | + | ... |
| ⋮ | ⋮ | ⋮ | ⋮ | ⋮ |     | ⋮ |     |
| n | − | + | − | + | ... | − | ... |
| ⋮ | ⋮ | ⋮ | ⋮ | ⋮ |     | ⋮ |     |

LIQUID CRYSTAL DISPLAY DEVICE INCLUDING SUB-PICTURE ELEMENTS

CROSS-REFERENCE TO RELATED APPLICATIONS

This application is based on and claims priority of Japanese Patent Application No. 2005-157641 filed on May 30, 2005, the entire contents of which are incorporated herein by reference.

BACKGROUND OF THE INVENTION

1. Field of the Invention

The present invention relates to a liquid crystal display device which includes a plurality of sub-picture element electrodes in one picture element area, and which inhibits a phenomenon in which a screen looks whitish when the screen is looked at in a diagonal direction.

2. Description of the Prior Art

Liquid crystal display devices are thinner and lighter in weight, and can be driven with lower voltage, consuming less power, than CRTs (Cathode Ray Tubes). For this reason, liquid crystal display devices are used for various electronic appliances, including television receivers, note PCs (personal computers), desktop PCs, PDAs (personal digital assistances) and mobile phones.

In general, each liquid crystal display device is configured of two substrates and liquid crystal filled in an interstice between the two substrates. On one substrate, a picture element electrode, a thin film transistor (hereinafter referred to as a "TFT") and the like are formed in each picture element. On the other substrate, color filters and a common electrode common among the picture elements are formed. Hereinafter, a substrate on which picture electrodes and TFTs are formed is referred to as a "TFT substrate, and a substrate arranged opposite to the TFT substrate is referred to as a "facing substrate." In addition, a structure where the liquid crystal is filled in the interstice between the TFT substrate and the facing substrate is referred to as a "liquid crystal panel."

TN (twisted nematic)-type liquid crystal display devices have been heretofore used widely. In the case of the TN-type liquid crystal display devices, a horizontal alignment type of liquid crystal (liquid crystal with a positive dielectric anisotropy) is filled in the interstice between the two substrates, and molecules of the liquid crystal are twisted and aligned. However, the TN-type liquid crystal display devices have a disadvantage that their viewing angle characteristics are poor so that their contrast and color tones vary greatly when their screens are looked at in a diagonal direction. For this reason, MVA (multi-domain vertical alignment)-type liquid crystal display devices each with a better viewing angle characteristic have been developed, and have been put in practical use.

However, in the case of the conventional type of MVA-type liquid crystal display devices, a phenomenon in which the screen looks whitish occurs when the screen are looked at in a diagonal direction. FIG. 1 is a diagram showing a T-V (transmittance-voltage) characteristic observed when the screen is looked at from the front, and a T-V characteristic observed when the screen is looked at from above at an angle of 60 degrees to the screen, where the axis of abscissas indicates applied voltage (V) and the axis of ordinates indicates transmittance. As shown in FIG. 1, when a voltage slightly higher than a threshold voltage is applied to a picture element electrode (a part encircled in the figure), transmittance observed when the screen is looked at in the diagonal direction is higher than transmittance observed when the screen is looked at from the front. In addition, when the applied voltage becomes higher to some extent, the transmittance observed when the screen is looked at in the diagonal direction becomes lower than the transmittance observed when the screen is looked at from the front. For this reason, the difference in luminance among the red, green and blue picture elements which is observed when the screen is looked at in the diagonal direction becomes smaller. As a result, the phenomenon in which the screen looks whitish occurs as described above. This phenomenon is termed as "wash-out." The wash-out occurs not only in the MVA-type liquid crystal display devices but also in the TN-type liquid crystal display devices.

The specification of U.S. Pat. No. 4,840,460 has proposed a TN-type liquid crystal display device in which one picture element is divided into a plurality of sub-picture elements, and in which these sub-picture elements are capacitance-coupled to one another. In the case of the liquid crystal display device of this kind, electric potential is divided depending on capacitance ratios respectively of the sub-picture elements. For this reason, mutually different voltages are applicable respectively to the sub-picture elements. As a result, a plurality of domains which are different from one another in the threshold value of the T-V characteristic are apparently present in one picture element. If the plurality of domains which are different from one another in the threshold value of the T-V characteristic are present in one picture element in this manner, T-V characteristics respectively of those domains are averaged. This inhibits a phenomenon in which the transmittance observed when the screen is looked at in the diagonal direction becomes higher than the transmittance observed when the screen is looked at from the front. As a result, the phenomenon in which the screen looks whitish when the screen is looked at in the diagonal direction (wash-out) is also inhibited. The method of improving the display characteristic by dividing one picture element into the plurality of domains which are different from one another in the T-V characteristic is termed as a "HT (halftone grayscale) method."

FIG. 2 is a plan view showing an example of the conventional type of liquid crystal display device realizing the HT method. FIG. 3 is a cross-sectional view of the conventional type of liquid crystal display device taken along the I-I line of FIG. 2. Incidentally, FIG. 2 shows an area equivalent to one picture element of the liquid crystal display device.

A plurality of gate bus lines 52 each extending in the horizontal direction (the X-axis direction) and a plurality of data bus lines 55 each extending in the vertical direction (the Y-axis direction) are formed on a glass substrate 51 serving as the base of the TFT substrate. Each of rectangular areas defined by the gate bus lines 52 and the data bus lines 55 is a picture element area. In addition, auxiliary capacitance bus lines 53 are formed on the glass substrate 51. The auxiliary capacitance bus lines 53 are arranged in parallel to the gate bus lines 52. Each of the auxiliary bus lines 53 cuts across the center of each of the picture element areas.

A first insulating film 54 is formed between a level where the gate bus lines 52 and the auxiliary capacitance bus lines 53 are formed and a level where the data bus lines 55 are formed. By the first insulating film 54, the gate bus lines 52 and the auxiliary capacitance bus lines 53 are electrically separated from the data bus lines 55.

A TFT 56, a control electrode 57, an auxiliary capacitance electrode 58, and sub-picture element electrodes 61a and 61b are formed in each of the picture element areas. In the case of this example, as shown in FIG. 2, a part of the gate bus line 52 is a gate electrode of the TFT 56. In addition, as shown in FIG. 3, a semiconductor film 56a which will serves as an active layer for the TFT 56 is formed above the gate bus line 52. A channel protection film 56b is formed on this semiconductor film 56a.

As shown in FIG. 2, a drain electrode 56d of the TFT 56 is connected to the data bus line 55, and a source electrode 56s thereof is arranged in a position opposite to the drain electrode 56d with the gate bus line 52 interposed in between. In addition, the auxiliary capacitance electrode 58 is arranged in a position opposite to the auxiliary capacitance bus line 53 with the first insulating film 54 interposed in between. Moreover, the control electrode 57 is electrically connected to the source electrode 56s and the auxiliary capacitance electrode 58 through an interconnect 59.

The data bus line 55, the TFT 56, the control electrode 57, the auxiliary capacitance electrode 58 and the interconnect 59 are covered with a second insulating film 60. The sub-picture element electrodes 61a and 61b are formed on the second insulating film 60. The sub-picture element electrode 61a is capacitance-coupled to the control electrode 57 (including a part of the interconnect 59 under the sub-picture element electrode 61a) with the second insulating film 60 interposed in between. In addition, the sub-picture element electrode 61b is electrically connected to the auxiliary capacitance electrode 58 through a contact hole 60a made in the second insulating film 60. The surfaces respectively of the sub-picture element electrodes 61a and 61b are covered with an alignment film 62.

On the other hand, as shown in FIG. 3, color filters 72 are formed on a surface (on the lower side in FIG. 3) of a glass substrate 71 serving as the base of a facing substrate. A common electrode 73 is formed on the color filters 72 (on the lower surface thereof in FIG. 3). The surface of the common electrode 73 is covered with an alignment film 74.

The TFT substrate and the facing substrate are arranged with spacers (not illustrated) interposed in between. Liquid crystal 80 is filled in the interstice between the TFT substrate and the facing substrate. Thus, a liquid crystal panel is completed. Polarizers are arranged on the two sides of this liquid crystal panel in the thickness direction thereof. A drive circuit and a backlight (neither of them is illustrated) are attached thereto. Thus, the liquid crystal display device is completed.

In the case of the liquid crystal display device configured in this manner, when a scanning signal supplied to the gate bus line 52 becomes active ("1"), the TFT 56 is turned on. Thus, a display signal supplied to the data bus line 55 is transferred to the control electrode 57 and the sub-picture element electrode 61b. The display signal supplied to the control electrode 57 is transferred to the sub-picture element electrode 61a through capacitance coupling. In this case, the voltage of the sub-picture element electrode 61a becomes lower than that of the sub-picture element electrode 61b by an amount equivalent to the capacitance coupling. For this reason, two domains which are different from each other in the T-V characteristic are apparently present in one picture element area. This inhibits a phenomenon in which the screen looks whitish when the screen is looked at in the diagonal direction.

However, in the case of the liquid crystal display device shown in FIG. 2, if the sizes of the control electrode 57 and the interconnect 59 vary in the photolithography step, a capacitance value between the control electrode 57 (including the part of the interconnect 59 under the sub-picture element electrode 61a) and the sub-picture element electrode 61a changes. Thus, the liquid crystal display device has a problem that display unevenness occurs.

In addition, the conventional type of liquid crystal display device shown in FIG. 2 has a problem that image sticking occurs as well. For example, if a halftone display is made after a black-and-white checkered pattern is continuously displayed on the entire screen for a certain length of time, the checkered pattern looks lighter in color due to the image sticking.

Usually, the image sticking of the liquid crystal display device stems from the following causes. One cause is that a direct-current component is present in signals flowing to the gate bus lines, the data bus lines and the like. The other cause is that the C and R values (the values respectively of the liquid crystal capacitance and the liquid crystal resistance) of the liquid crystal layer during white display are different from those during black display. Descriptions will be provided below for the reasons why the image sticking occurs in the liquid crystal display device as shown in FIGS. 2 and 3.

FIG. 4 is a plan view showing one picture element of the liquid crystal display device realizing the HT method. FIG. 5A is a schematic cross-sectional view of the picture element taken along the II-II line of FIG. 4. FIG. 5B is a schematic cross-sectional view of the picture element taken along the III-III line of FIG. 4. FIG. 5C is a schematic cross-sectional view of the picture element taken along the IV-IV line of FIG. 4. FIG. 5D is a schematic cross-sectional view of the picture element taken along the V-V line of FIG. 4.

In the case of the liquid crystal display device shown in FIG. 4, as shown in FIG. 5A, $C_{LC2}$ and $R_{LC2}$ can be regarded as being connected in parallel between the sub-picture element electrode 61a and the common electrode 73. In this respect, $C_{LC2}$ denotes a capacitance between the sub-picture element electrode 61a and the common electrode 73, and $R_{LC2}$ denotes a resistance between the sub-picture element electrode 61a and the common electrode 73.

In addition, $C_{gpx2}$ and $R_{goff}$ can be regarded as being connected in parallel between the sub-picture element electrode 61a and the gate bus line 52 as well. In this respect, $C_{gpx2}$ denotes a capacitance between the sub-picture element electrode 61a and the gate bus line 52, and $R_{goff}$ denotes a resistance between the sub-picture element electrode 61a and the gate bus line 52.

On the other hand, as shown in FIG. 5B, $C_{LC1}$ and $R_{LC1}$ can be regarded as being connected in parallel between the sub-picture element electrode 61b and the common electrode 73 as well. In this respect, $C_{LC1}$ denotes a capacitance between the sub-picture element electrode 61b and the common electrode 73, and $R_{LC1}$ denotes a resistance between the sub-picture element electrode 61b and the common electrode 73.

Furthermore, $C_{gpx1}$ and $R_{gpx1}$ can be regarded as being connected in parallel between the sub-picture element electrode 61b and the gate bus line 52 as well. In this respect, $C_{gpx1}$ denotes a capacitance between the sub-picture element electrode 61b and the gate bus line 52, and $R_{gpx1}$ denotes a resistance between the sub-picture element electrode 61b and the gate bus line 52.

A direct-current voltage ($V_{goff}$) of approximately −5V to −10V is applied to the gate bus line 52 for almost all the length of time in one vertical synchronization period (one field period) (while the scanning signal is inactive) for the purpose of keeping the TFT 56 in the OFF state. An electric charge depending on this direct-current voltage is accumulated in each of the sub-picture element electrodes 61a and 61b respectively through a group of the capacitance $C_{gpx2}$ and the resistance $R_{goff}$ or a group of the capacitance $C_{gpx1}$ and the resistance $R_{gpx1}$.

Usually, scanning signals applied to each of the gate bus lines 52 sequentially become active once in each vertical synchronization period. At this time, the TFT 56 is turned on. Thus, the sub-picture element electrode 61b and the data bus line 55 are electrically connected to each other. For this reason, the electric charge, which has been accumulated in the sub-picture element electrode 61b while the TFT 56 is off, flows to the data bus line 55, and thus the direct-current voltage component does not remain in the sub-picture element electrode 61b. On the other hand, even if the TFT 56 is turned on, the electric charge accumulated in the sub-picture element electrode 61a is held as it is in the sub-picture element electrode 61a. For this reason, the direct-current voltage component remains in the sub-picture electrode 61a.

Furthermore, as shown in FIG. 5C, $C_{dpx2}$ and $R_{dpx2}$ can be regarded as being connected in parallel between the sub-picture element electrode 61a and the data bus line 55. In this respect, $C_{dpx2}$ denotes a capacitance between the sub-picture element electrode 61a and the data bus line 55, and $R_{dpx2}$ denotes a resistance between the sub-picture element electrode 61a and the data bus line 55.

Moreover, as shown in FIG. 5D, $C_{dpx1}$ and $R_{dpx1}$ can be regarded as being connected in parallel between the sub-picture element electrode 61b and the data bus line 55 as well. In this respect, $C_{dpx1}$ denotes a capacitance between the sub-picture element electrode 61b and the data bus line 55, and $R_{dpx1}$ denotes a resistance between the sub-picture element electrode 61b and the data bus line 55.

In the data bus line 55, a direct-current voltage higher than the electric potential of the common electrode 73 by approximately 1V to 2V is superimposed on a display signal (alternating current signal) for the purpose of compensating for a field-through voltage. An electric charge depending on this direct-current voltage is also accumulated in the sub-picture element electrodes 61a and 61b respectively through a group of the capacitance $C_{dpx2}$ and the resistance $R_{dpx2}$ or a group of the capacitance $C_{dpx1}$ and the resistance $R_{dpx1}$.

As described above, the TFT 56 is turned on once in each vertical synchronization period, and thus the sub-picture element electrode 61b and the data bus line 55 are electrically connected to each other. At this time, the electric charge accumulated in the sub-picture element 61b flows to the data bus line 55, and accordingly the direct-current voltage component does not remain in the sub-picture element electrode 61b. On the other hand, the electric charge accumulated in the sub-picture element 61a is held as it is in the sub-picture element 61a, even when the TFT 56 is turned on. For this reason, the direct-current voltage component remains in the sub-picture element electrode 61a.

In this manner, almost no direct-current voltage component is accumulated in the sub-picture element electrode 61b which is electrically connected to the data bus line 55 through the TFT 56 in certain periods. By contrast, the electric charge is accumulated in the sub-picture element electrode 61a capacitance-coupled to the control electrode 57, and accordingly the direct-current voltage component remains there.

Next, descriptions will be provided for a relationship between the electric charge accumulated in the sub-picture element electrode 61a and the image sticking.

When the area and cell thickness of the sub-picture element electrode 61a are denoted respectively by S and d, the capacitance (liquid crystal capacitance) $C_{LC2}$ between the sub-picture element electrode 61a and the common electrode 73 is expressed as follows.

$$C_{LC2} = \in (S/d)$$

where $\in$ denotes a dielectric constant of the liquid crystal. The dielectric constant of liquid crystal molecules aligned in a direction perpendicular to the substrate surface is different from the dielectric constant of liquid crystal molecules aligned in the horizontal direction. For this reason, a value of the liquid crystal capacitance of a picture element displaying a white part of a checkered pattern is different from a value of the liquid crystal capacitance of a picture element displaying a black part of the checkered pattern. As a result, a value of the direct-current voltage component applied to a part of a liquid crystal layer which corresponds to the white display is different from a value of the direct-current voltage component applied to a part of the liquid crystal layer which corresponds to the black display. Even if the checkered-pattern display is switched to a halftone display, the direct-current voltage components remaining respectively in the two parts of the liquid crystal layer do not change quickly. For this reason, the voltage applied to the part of the liquid crystal layer in the picture element displaying white is different from the voltage applied to the part of the liquid crystal layer in the picture element displaying black. As a result, the light transmittance of the picture element displaying white is different from the light transmittance of the picture element displaying black. This causes the image sticking. Incidentally, the image sticking stemming from such a cause decreases in a length of time depending on a time constant between the sub-picture element electrode and a group of the control electrode and the common electrode. However, for the purpose of enhancing the display quality, the image sticking needs to be made as small as possible.

SUMMARY OF THE INVENTION

With the foregoing matters taken into consideration, an object of the present invention is to provide a liquid crystal display device which makes it possible to inhibit wash-out, to avoid occurrence of display unevenness or image sticking, and to exhibit better display quality.

The above-described problems are solved by a liquid crystal display device which is configured of first and second substrates arranged opposite to each other as well as liquid crystal filled in an interstice between the first and second substrates, and which includes a plurality of picture elements arrayed in a matrix. The liquid crystal display device is characterized by including: a plurality of gate bus lines each for supplying a scanning signal to each of the picture elements; a plurality of data bus lines each for supplying a display signal to each of the picture elements; a first and second sub-picture element electrodes formed in each of the picture elements; a buffer capacitance formed in each of the picture elements; a first transistor which is driven by a scanning signal of an nth gate bus line (n is an integer), and which transfers a display signal of an mth data bus line (m is an integer) to the first sub-picture element electrode in an nth row and an mth column while the first transistor is on; a second transistor which is driven by the scanning signal of the nth gate bus line, and which transfers the display signal of the mth data bus line to the second sub-picture element electrode in the nth row and the mth column while the second transistor is on; and a third transistor which is connected between the first sub-picture element electrode in the nth row and the mth column and the buffer capacitance, and which is driven by a scanning signal of a (n+1)th gate bus line.

The liquid crystal display device according to the present invention includes the first and second sub-picture element electrodes, the buffer capacitance, and the first to third transistors in each of the picture elements. The first sub-picture element electrode is connected to the first and third transistors. The second sub-picture element electrode is connected to the second transistor. In addition, the buffer capacitance is connected between the third transistor and any one of, for example, the (n+1)th gate bus line, the mth data bus line, the (m+1)th data bus line and the common electrode. In this respect, it is supposed that the buffer capacitance is connected between the third transistor and the (n+1)th gate bus line for the purpose of making descriptions simple.

The first and second transistors are turned on when the scanning signal supplied to the nth gate bus line becomes active. Thus, the display signal is transferred to each of the first and second sub-picture element electrodes. Subsequently, the scanning signal supplied to the nth gate bus line becomes inactive, and thus the first and second transistors are turned off. At this time, equal voltages are held respectively in the first and second sub-picture element electrodes.

Thereafter, when the scanning signal supplied to the (n+1) th gate bus line becomes active and thus the third transistor is turned on, an electric charge is injected to the first sub-picture element electrode from the (n+1)th gate bus line through the buffer capacitance and the third transistor. As a result, the voltage of the first sub-picture element electrode changes slightly. Thereby, the voltages respectively of the first and second sub-picture element electrodes become different from each other. As in the case of the HT method, two domains which are different from each other in the T-V characteristic are apparently present in one picture element area. This inhibits the phenomenon in which a screen looks whitish when the screen is looked at in a diagonal direction (the wash-out).

In a case where the buffer capacitance is connected to any one of the mth data bus line, the (m+1)th data bus line and the common electrode instead of being connected to the nth gate bus line, when the scanning signal of the (n+1)th gate bus line becomes active, the voltage of the first sub-picture element electrode changes as well. This inhibits the phenomenon in which the screen looks whitish when the screen is looked at in the diagonal direction (the wash-out).

In addition, in the case of the present invention, when the scanning signal supplied to the nth gate bus line becomes active, both of the first and second sub-picture element electrodes are connected to the data bus line. For this reason, the electric charges which are direct-current voltage components accumulated in the first and second sub-picture electrodes due to the signals flowing to the gate bus line and the data bus line while the first and second transistors are off flow to the data bus line respectively through the first and second transistors. This makes it possible to prevent the image sticking from occurring.

Incidentally, a liquid crystal display device having a plurality of sub-picture element electrodes and a plurality of transistors in each picture element is described in Japanese Patent Laid-open Official Gazette No. 2002-333870. However, the liquid crystal display device described in Japanese Patent Laid-open Official Gazette No. 2002-333870 is not provided with a digital/analog converter circuit, and makes halftone display on the basis of digital image signals. Voltages depending on digital values are independently applied to the sub-picture elements respectively. As a result, unlike the liquid crystal display device according to the present invention, the liquid crystal display device described in Japanese Patent Laid-open Official Gazette No. 2002-333870 is incapable of inhibiting the wash-out.

BRIEF DESCRIPTION OF THE DRAWINGS

FIGS. 10A to 10E are diagrams each showing a method of manufacturing the liquid crystal display device according to the first embodiment.

FIGS. 13A and 13B are schematic diagrams each showing a method of driving the liquid crystal display device (polarities of a picture element).

DESCRIPTION OF THE PREFERRED EMBODIMENTS

Hereinafter, detailed descriptions will be provided for the present invention.

First Embodiment

Figure 6:
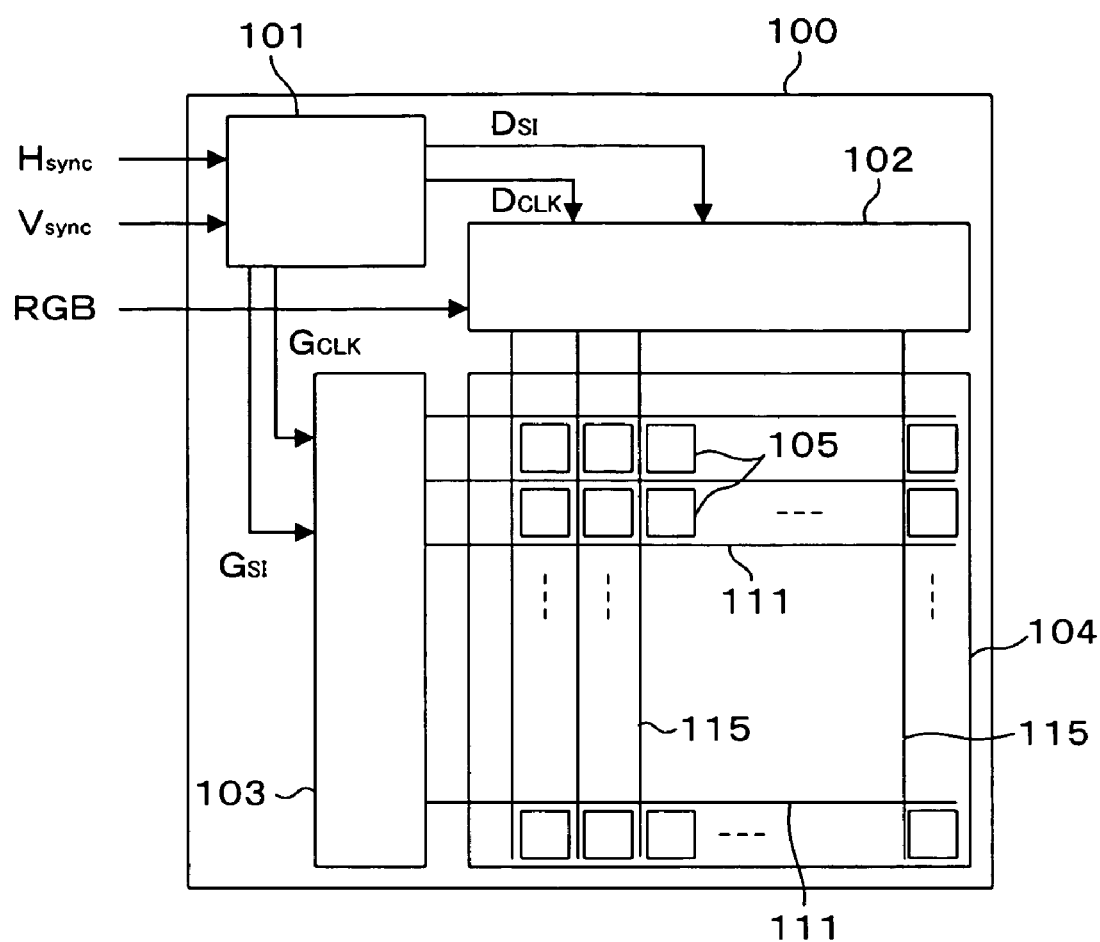
FIG. 6 is a block diagram showing an overall configuration of a liquid crystal display device according to a first embodiment of the present invention.

FIG. 6 is a block diagram showing an overall configuration of a liquid crystal display device according to a first embodiment of the present invention. Incidentally, this embodiment shows an example where the present invention is applied to an MVA (Multi-domain Vertical Alignment)-type liquid crystal display device.

A liquid crystal display device 100 according to this embodiment is configured of a control circuit 101, a data driver 102, a gate driver 103 and a liquid crystal panel 104. Signals, including digital display signals R, G and B, horizontal synchronization signals Hsync and vertical synchronization signals Vsync, are supplied to this liquid crystal display device 100 from an external apparatus (not illustrated), such as a computer.

A plurality of picture elements 105 are arrayed in a matrix on the liquid crystal panel 104. In addition, a plurality of data bus lines 115 each extending in the vertical direction and a plurality of gate bus lines 111 each extending in the horizontal direction are provided onto the liquid crystal panel 104. In the case of the liquid crystal display device according to this embodiment, the gate bus lines 111 and the data bus lines 115 constitute boundaries of each of the picture elements 105. Detailed descriptions will be provided later for the picture elements 105.

The control circuit 101 receives a horizontal synchronization signal Hsync and a vertical synchronization signal Vsync, and thus outputs a data start signal DSI, a data clock DCLK, a gate start signal GSI and a gate clock GCLK. The data start signal DSI becomes active when a horizontal synchronization period starts. The data clock DCLK divides the horizontal synchronization period at certain intervals. The gate start signal GSI becomes active when a vertical synchronization period starts. The gate clock GCLK divides the vertical synchronization period at certain intervals.

The data driver 102 converts the digital display signals R, G and B received from the external apparatus to analog display signals. Thus, the data driver 102 supplies the analog display signals to each of data bus lines 115 in each horizontal synchronization period with timings based on the data start signal DSI and the data clock DCLK which have been received from the control circuit 101. These analog display signals are alternating current signals whose polarities alternate, for example, in each frame (each vertical synchronization period).

On the other hand, the gate driver 103 sequentially makes a scanning signal active in one vertical synchronization period on the basis of the gate start signal GSI and the gate clock GCLK which have been received from the control circuit 101. The scanning signal is supplied to each of the gate bus lines 111. When the scanning signal is inactive, the voltage is approximately −5V to −10V. When the scanning signal is active, the voltage is approximately 15V to 30V.

Figure 7:
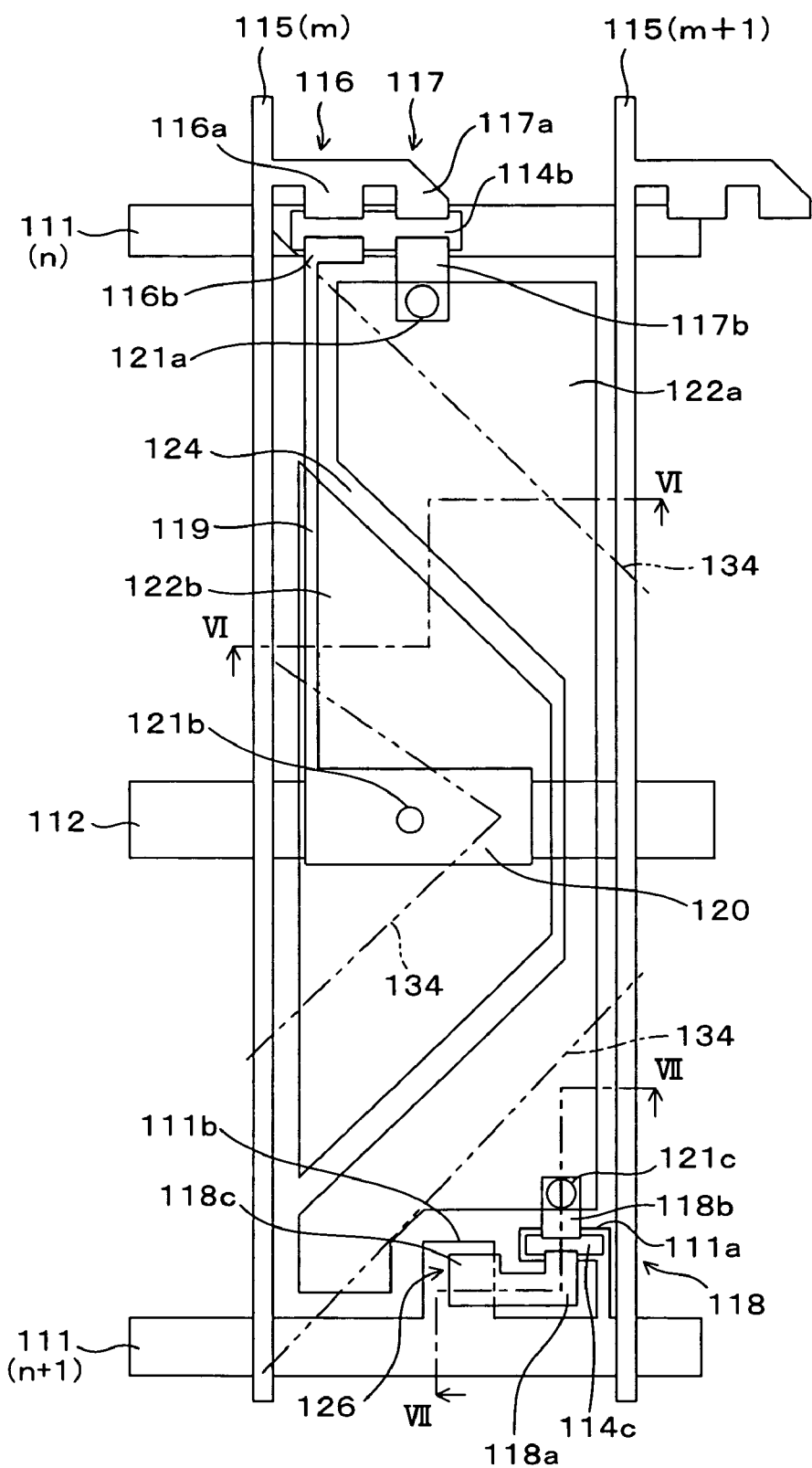
FIG. 7 is a plan view showing one picture element of the liquid crystal display device according to the first embodiment.
Figure 8:
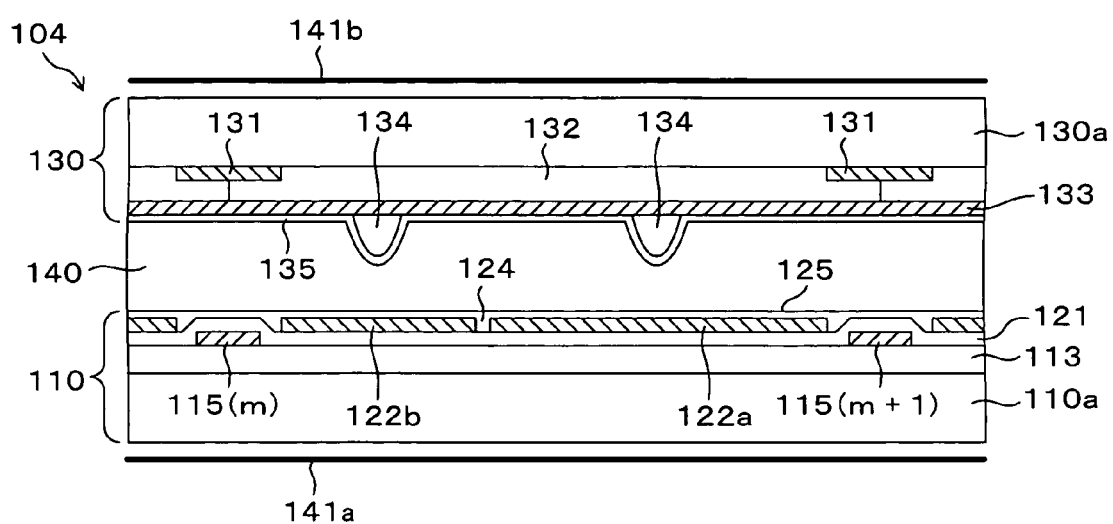
FIG. 8 is a cross-sectional view of the picture element taken along the VI-VI line of FIG. 7.
Figure 9:
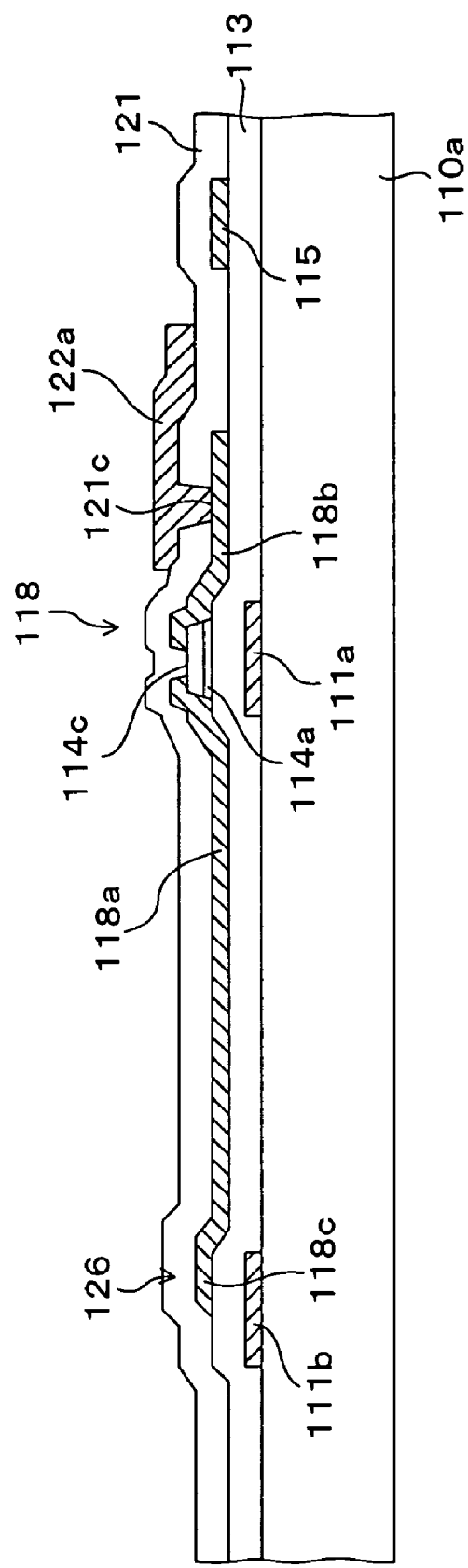
FIG. 9 is a cross-sectional view of a TFT substrate taken along the VII-VII line of FIG. 7.

FIG. 7 is a plan view showing one picture element of the liquid crystal display device according to this embodiment. FIG. 8 is a cross-sectional view of the picture element taken along the VI-VI line of FIG. 7. FIG. 9 is a cross-sectional view of the TFT substrate taken along the VII-VII line of FIG. 7. Incidentally, an illustration of alignment films is omitted in FIG. 9.

As shown in FIG. 8, the liquid crystal panel 104 is configured of a TFT substrate 110, a facing substrate 130, and liquid crystal 140 which is filled in an interstice between the substrates. The dielectric anisotropy of the liquid crystal 140 is negative. A first polarizer 141a is arranged on the back surface of the liquid crystal panel 104 (on the lower surface thereof in FIG. 8), and a second polarizer 141b is arranged on the front surface of the liquid crystal panel 104 (on the uppermost surface thereof in FIG. 8). These polarizers 141a and 141b are arranged in a way that absorption axes respectively of the two polarizers are orthogonal to each other. In addition, a backlight (not illustrated) is arranged at the side of the back surface of the liquid crystal panel 104.

As shown in FIG. 7, the plurality of gate bus lines 111 each extending in the horizontal direction and the plurality of data bus lines 115 each extending in the vertical direction are formed on the TFT substrate 110. Each of rectangular areas defined by these gate bus lines 111 and these data bus lines 115 is a picture element area. In addition, auxiliary capacitance bus lines 112 are formed on the TFT substrate 110. The auxiliary capacitance bus lines 112 are arranged in parallel with the gate bus lines 111. Each of the auxiliary bus lines 112 cuts across the center of each of the picture element areas.

The gate bus lines 111 and the auxiliary capacitance bus lines 112 are formed on a glass substrate 110a serving as the base of the TFT substrate 110. A first insulating film 113 is formed over the gate bus lines 111 and the auxiliary capacitance bus lines 112. The data bus lines 115 are formed on the first insulating film 113.

In addition, TFTs 116, 117 and 118, an auxiliary capacitance electrode 120, sub-picture element electrodes 122a and 122b, a buffer capacitance lower electrode 111b and a buffer capacitance upper electrode 118c are formed in each of the picture element areas on the TFT substrate 110. In the case of this embodiment, as shown in FIG. 7, parts of an nth gate bus line 111 are respectively gate electrodes of the TFT 116 and 117 (n is an integer). An interconnect 111a extending from a (n+1)th gate bus line 111 is a gate electrode of the TFT 118. Moreover, the buffer capacitance lower electrode 111b is connected to the (n+1)th gate bus line 111.

A semiconductor film (a silicon film or the like) 114a which is an active film for the TFTs 116, 117 and 118 is formed over each of predetermined areas respectively of the gate bus line 111 and the interconnect 111a. Channel protection films 114b and 114c are formed on areas serving as channels respectively of the semiconductors film 114a. A drain electrode 116a and a source electrode 116b of the TFT 116 are arranged respectively in positions opposite to each other with the channel protection film 114b interposed in between. Similarly, a drain electrode 117a and a source electrode 117b of the TFT 117 are also arranged respectively in positions opposite to each other with the channel protection film 114b interposed in between. Furthermore, a drain electrode 118a and a source electrode 118b of the TFT 118 are arranged respectively in positions opposite to each other with the channel protection film 114c interposed in between. As well, both of the drain electrodes 116a and 117a respectively of the TFTs 116 and 117 are connected to an mth data bus line 115 (m is an integer).

The auxiliary capacitance electrode 120 is arranged in a position opposite to the auxiliary capacitance bus line 112 with the first insulating film 113 interposed in between. An auxiliary capacitance is configured of the auxiliary capacitance electrode 120, the auxiliary capacitance bus line 112, and the first insulating film 113 in between. This auxiliary capacitance electrode 120 is connected to the source electrode 116b of the TFT 116 through an interconnect 119.

In addition, the buffer capacitance upper electrode 118c is arranged in a position opposite to the buffer capacitance lower electrode 111b with the first insulating film 113 interposed in between. The buffer capacitance upper electrode 118c is connected to the drain electrode 118a of the TFT 118. A buffer capacitance 126 is configured of the buffer capacitance upper electrode 118c, the buffer capacitance lower electrode 111b, and the first insulating film 113 in between.

A second insulating film 121 is formed over the data bus line 115, the TFTs 116, 117 and 118, the interconnect 119, the auxiliary capacitance electrode 120 and the buffer capacitance upper electrode 118c. Sub-picture element electrodes 122a and 122b are formed on the second insulating film 121. The sub-picture element electrodes 122a and 122b are formed of a transparent electric conductor, such as ITO (indium-tin oxide), and are separated from each other by a slit 124. The slit 124 includes a part extending in a direction diagonal to the data bus lines 115 and the other part extending in a direction parallel to the data bus lines 115. In addition, the slit 124 is formed in symmetry on upper and lower sides of the center line of the picture element, the center line being parallel to the gate bus lines 111. This slit 124 functions as an alignment controlling structure for controlling directions in which liquid crystal molecules tilt when voltage is applied.

The sub-picture element electrode 122a is electrically connected to the source electrode 117b of the TFT 117 and the source electrode 118b of the TFT 118 respectively through contact holes 121a and 121c made in the second insulating film 121. In addition, the sub-picture element electrode 122b is electrically connected to the auxiliary capacitance electrode 120 through a contact hole 121b made in the second insulating film 121. A vertical alignment film 125 made of polyimide or the like is formed over these sub-picture element electrodes 122a and 122b.

On the other hand, as shown in FIG. 8, the facing substrate 130 is configured of a glass substrate 130a, black matrixes (light blocking films) 131, color filters 132, a common electrode 133 and protrusions 134. The glass substrate 130a serves as the base of the facing substrate 130. The black matrixes 131 are formed on a surface of the glass substrate 130a (the lower surface thereof in FIG. 8). The black matrixes 131 are arranged in positions opposite to the gate bus lines 111, the data bus lines 115, and the TFTs 116, 117 and 118, on the TFT substrate 110. The width of each of the black matrixes 131 is set up to be slightly wider than the width of each of the gate bus lines 111 and the data bus lines 115.

There are three types of color filters 132; red (R), green (G) and blue (B). One color filter with any one of red (R), green (G) and blue (B) is arranged in each of the picture elements. In the case of this embodiment, a group of red, green and blue picture elements neighboring in the horizontal direction constitutes one pixel, and thus makes it possible to display various colors.

The surface of the color filter 132 is covered with the common electrode 133 made of a transparent electric conductor such as ITO. In addition, as shown in FIG. 8, bank-shaped protrusions 134 are formed respectively as alignment controlling structures on the common electrode 133 (on the lower surface thereof in FIG. 8). These protrusions 134 are formed, for example, of a dielectric material such as photoresist. The protrusions 134 are arranged in positions away from the slit 124, which are almost in parallel with the slit 124, as shown by a long dashed double-short dashed line in FIG. 7. The surfaces respectively of the common electrode 133 and the protrusions 134 are covered with a vertical alignment film 135 made of polyimide.

Descriptions will be provided below for an operation of the liquid crystal display device according to this embodiment. Incidentally, descriptions will be provided for a picture element in an nth row and an mth column shown in FIG. 7. The liquid crystal molecules are aligned in a direction perpendicular to the surfaces respectively of the alignment films 125 and 135 while in an initial state (in a state where voltage is applied to none of the sub-picture element electrodes 122a and 122b).

In the case of the liquid crystal display device according to this embodiment, when a scanning signal supplied to the nth gate bus line 111 becomes active, the TFTs 116 and 117 are turned on. Thus, a display signal supplied to the mth data bus line 115 is transferred to the auxiliary capacitance electrode 120 and the sub-picture element electrodes 122a and 122b. Subsequently, when the scanning signal becomes inactive and thus the TFTs 116 and 117 are turned off, the voltage depending on the display signal is held in each of the sub-picture element electrodes 122a and 122b. Thus, the liquid crystal molecules are tilted at an angle depending on the voltage held in each of the sub-picture element electrodes 122a and 122b. An amount of light depending on the tilt angle of the liquid crystal molecules is transmitted through the picture element. In this case, liquid crystal molecules on one side of each of the slit 124 and the protrusions 134 are tilted in a direction reverse to a direction in which liquid crystal molecules on the other side of each of the slit 124 and the protrusions 134 are tilted. Thus, what is termed as alignment division (multi-domain) is achieved, and accordingly a desirable viewing angle characteristic can be obtained.

Next, when a scanning signal supplied to the (n+1)th gate bus line 111 becomes active, the TFT 118 is turned on. An electric charge is injected to the sub-picture element 122a from the (n+1)th gate bus line 111 through the buffer capacitance 126 and the TFT 118. Thereby, the voltage held in the sub-picture element 122a becomes slightly higher than the voltage held in the sub-picture element 122b. As a result, in common with the foregoing HT method, two domains (a domain in which the sub-picture element electrode 122a is arranged and a domain in which the sub-picture element electrode 122b is arranged) which are different from each other in T-V characteristic are present in the single picture element. This inhibits a phenomenon in which the screen looks whitish when the screen is looked at in a diagonal direction (wash-out). Incidentally, an amount of voltage build-up in the sub-picture element electrode 122a depends on the voltage of the display signal and a capacitance value of the buffer capacitance 126.

Figure 1:
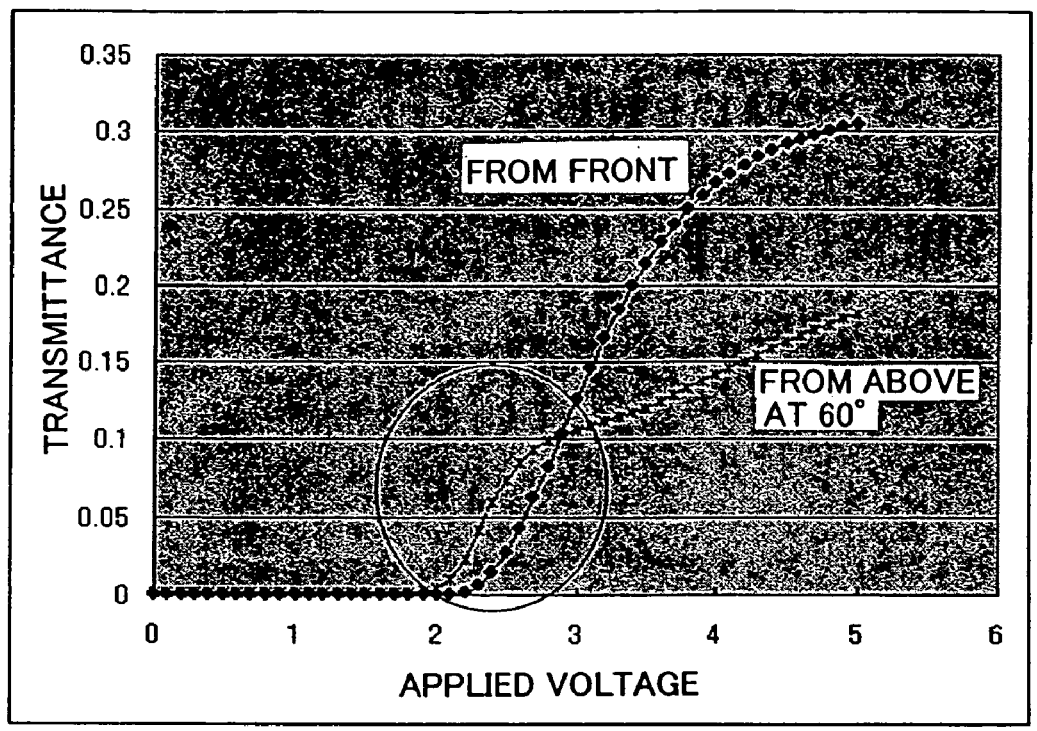
FIG. 1 is a diagram showing a T-V (transmittance-voltage) characteristic which is observed when a screen is looked at from the front, and a T-V characteristic which is observed when the screen is looked at from above at an angle of 60 degrees to the screen.
Figure 2:
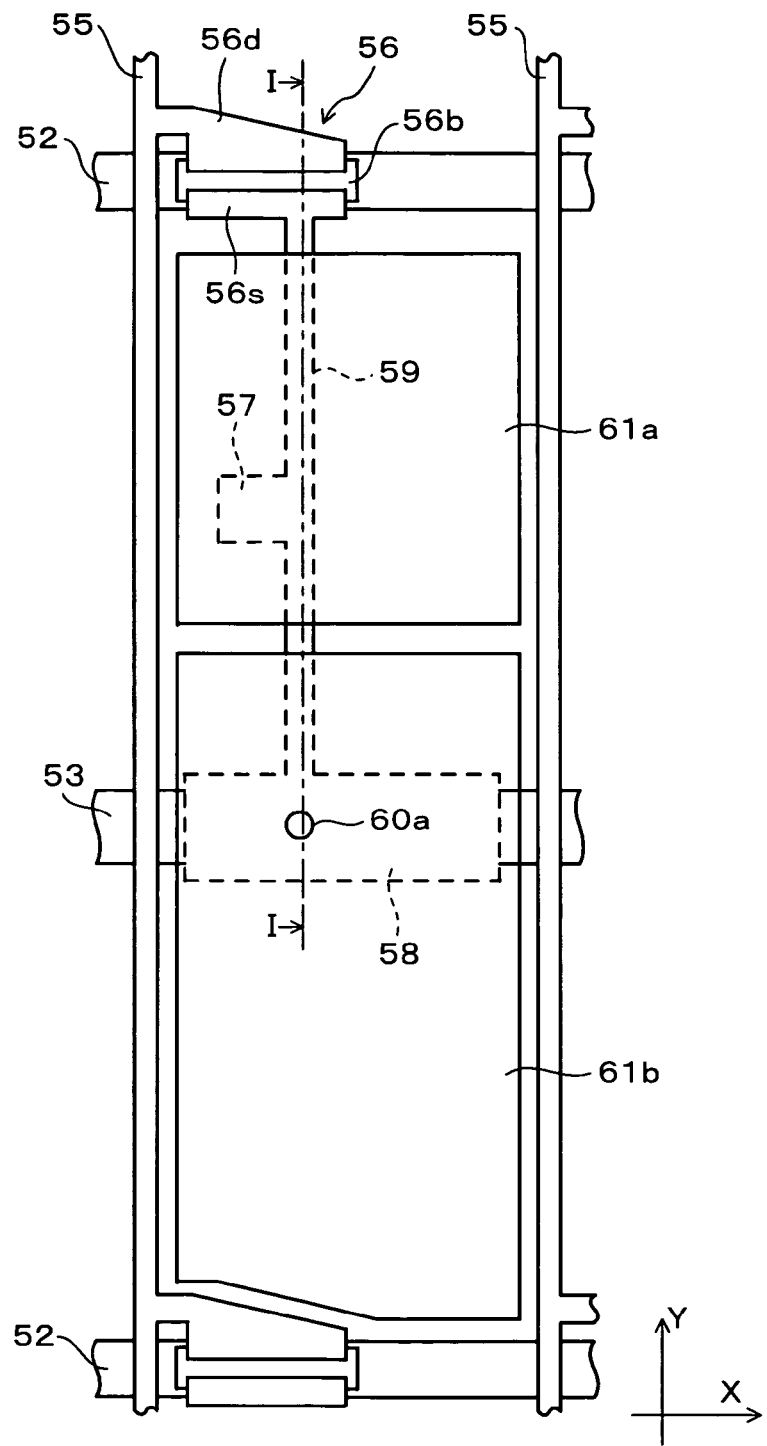
FIG. 2 is a plan view showing an example of a conventional type of liquid crystal display device realizing an HT method.
Figure 3:
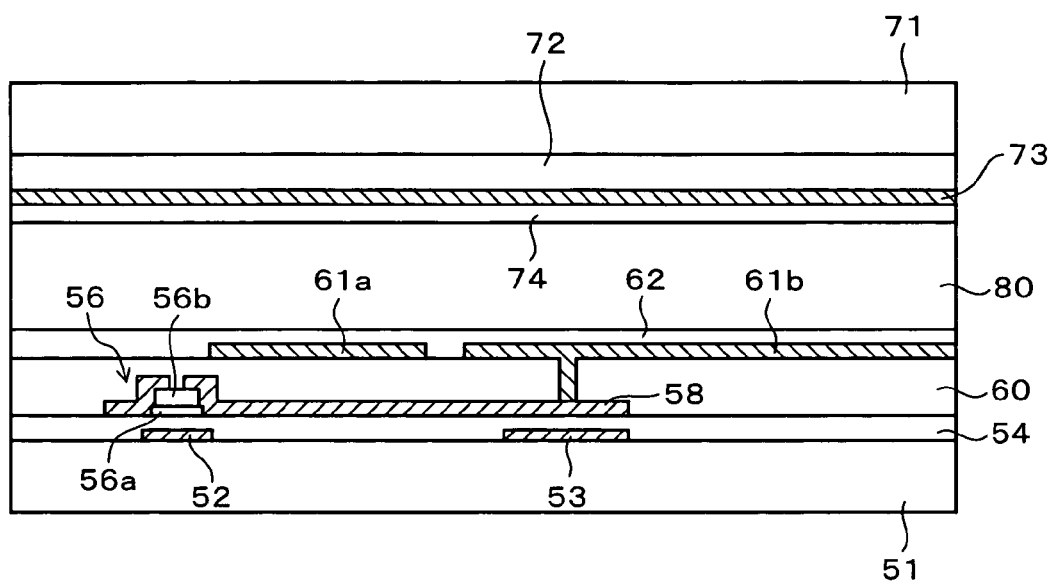
FIG. 3 is a cross-sectional view of the conventional type of liquid crystal display device taken along the I-I line of FIG. 2.
Figure 4:
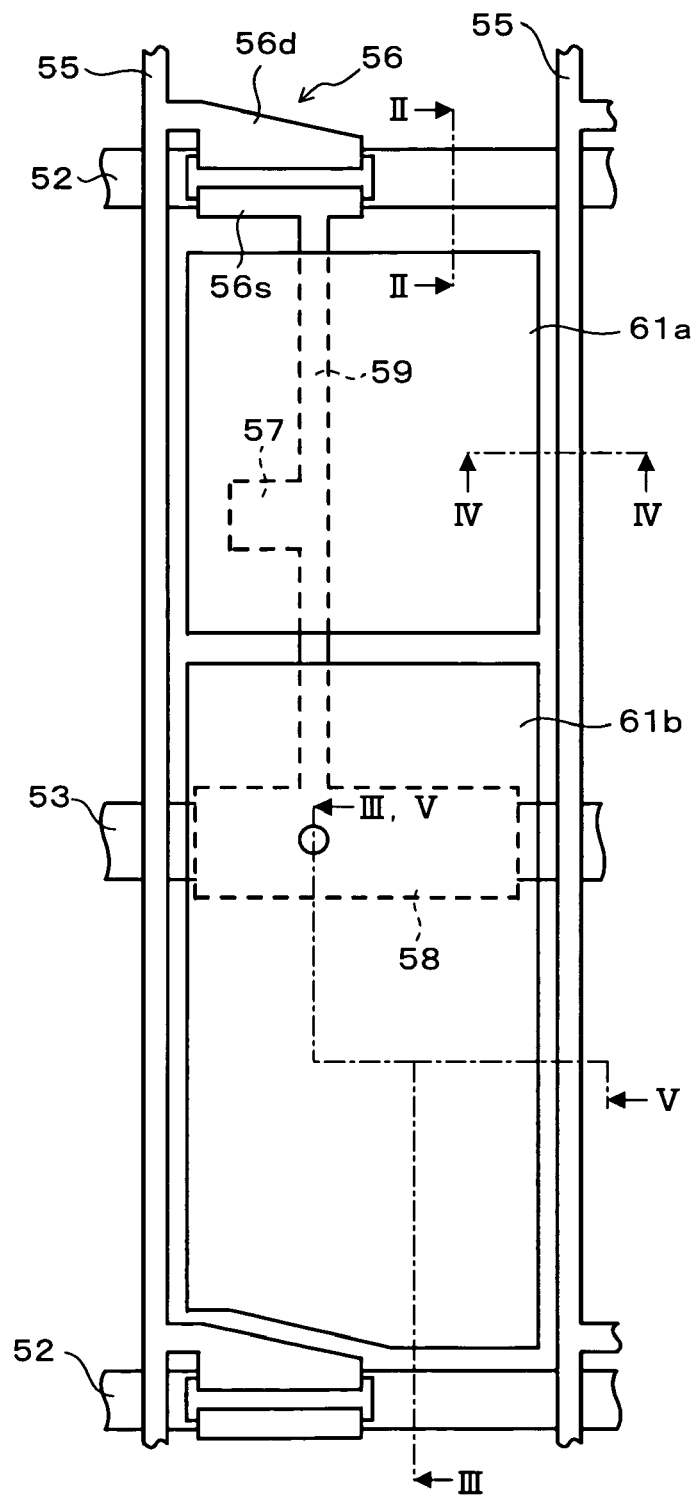
FIG. 4 is a plan view showing one picture element of the liquid crystal display device realizing the HT method.
Figure 5A:
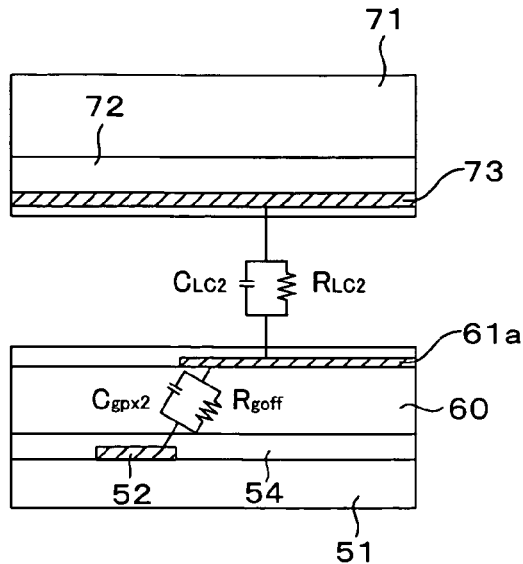
FIG. 5A is a schematic cross-sectional view of the picture element taken along the II-II line of FIG. 4.
Figure 5C:
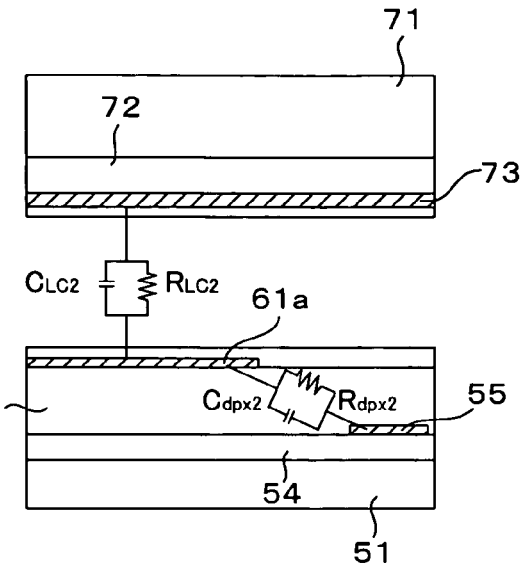
FIG. 5C is a schematic cross-sectional view of the picture element taken along the IV-IV line of FIG. 4.
Figure 5B:
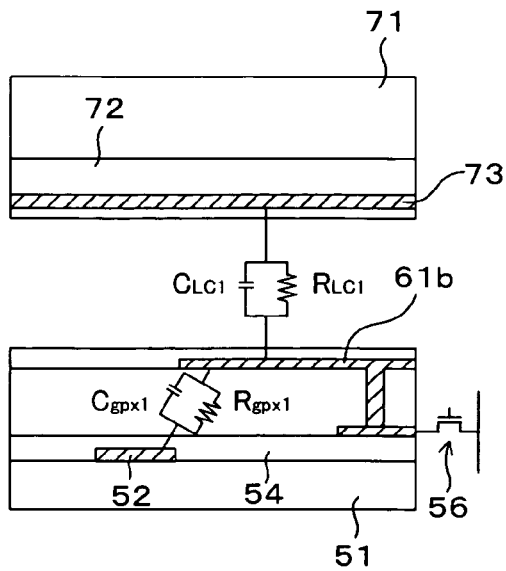
FIG. 5B is a schematic cross-sectional view of the picture element taken along the III-III line of FIG. 4.
Figure 5D:
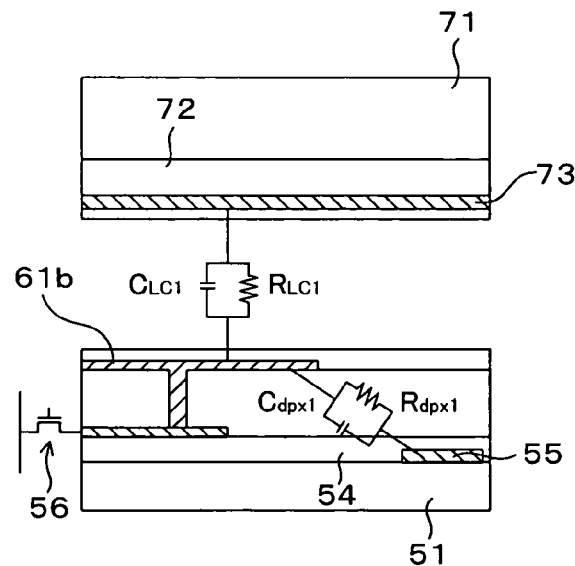
FIG. 5D is a schematic cross-sectional view of the picture element taken along the V-V line of FIG. 4.

In the case of the conventional type of liquid crystal display device shown in FIG. 2, voltage is applied to the sub-picture element 61a through the capacitance between the control electrode 57 (including a part of the interconnect 59 under the sub-picture element electrode 61a) and the sub-picture element electrode 61a. For this reason, the size of the control electrode 57 needs to be made relatively large. By contrast, in the case of the liquid crystal display device according to this embodiment, the display signal (display voltage) is applied to the sub-picture element electrode 122a through the TFT 117, and thereafter the voltage held in the sub-picture element electrode 122a is just slightly changed by means of the TFT 118 and the buffer capacitance 126. For this reason, it suffices that the size of each of the electrodes (the lower electrode 111b and the upper electrode 118c) of the buffer capacitance is smaller than the size of the control electrode 57 (including the part of the interconnect 59 under the sub-picture element electrode 61a) of the liquid crystal display device shown in FIG. 2. As a result, the aperture ratio of the liquid crystal display device according to this embodiment is larger than that of the conventional type of liquid crystal display device shown in FIG. 2. This also brings about an advantage that the liquid crystal display device according to this embodiment can make a brighter display. Moreover, in the case of the liquid crystal display device according to this embodiment, the change in the voltage held in the sub-picture element 122a, which stems from variation in the capacitance value of the buffer capacitance 126, is relatively small. For this reason, the liquid crystal display device according to this embodiment has an advantage that display unevenness stemming from the photolithography step is inhibited from occurring in comparison with the conventional liquid crystal display device shown in FIG. 2.

In the case of this embodiment, while the TFTs 116 and 117 are off, an electric charge which is a direct-current voltage component is accumulated in the sub-picture element electrodes 122a and 122b as well, by the signals supplied respectively to the gate bus line 111 and the data bus line 115. In the case of this embodiment, however, the TFTs 116 and 117 are turned on, and thus both of the sub-picture element electrodes 122a and 122b are electrically connected to the data bus line 115, in each frame (each vertical synchronization period). For this reason, the electric charge which is the direct-current component accumulated in each of the sub-picture element electrodes 122a and 122b flows to the data bus line 115, and thus image sticking is avoided. This brings about an effect that a desirable display quality can be obtained.

Descriptions will be provided below for a method of manufacturing the liquid crystal display device according to this embodiment.

First of all, descriptions will be provided for a method of manufacturing the TFT substrate with reference to FIG. 7 and FIG. 10A to 10E. Incidentally, FIGS. 10A to 10E respectively show cross-sections of the TFT substrate 110 taken along the VII-VII line of FIG. 7.

To begin with, a first metal film, for example, with an Al (aluminum)-MoN (molybdenum nitride)-Mo (molybdenum) lamination structure, is formed on the glass substrate 110a by means of the sputtering method. The glass substrate 110a serves as the base of the TFT substrate 110. Subsequently, the first metal film is patterned by means of the photolithography method. Thereby, the gate bus line 111, the interconnect 111a, the buffer capacitance lower electrode 111b and the auxiliary capacitance bus line 112 are formed as shown in FIGS. 7 and 10A.

Subsequently, as shown in FIG. 10B, the first insulating film (gate insulating film) 113 made, for example, of $SiO_2$ is formed on the entire upper surface of the glass substrate 110a by means of the CVD (Chemical Vapor Deposition) method. After that, the semiconductor film 114a which serves as an active layer for the TFTs 116, 117 and 118 is formed on a predetermined area of the first insulating film 113. Thereafter, for example, a SiN film is formed on the entire upper surface of the resultant glass substrate 110a, and this SiN film is patterned by means of the photolithography method. Thus, the channel protection films 114b and 114c are formed on areas which serve respectively as channels of the semiconductor film 114a.

Subsequently, a second metal film, for example, with a Ti (titanium)-Al—Ti lamination structure is formed on the entire upper surface of the glass substrate 110a. The second metal film is patterned by means of the photolithography method. Thus, as shown in FIGS. 7 and 10C, the data bus line 115, the drain electrodes 116a, 117a and 118a, the source electrodes 116b, 117b and 118b, the buffer capacitance upper electrode 118c, the interconnect 119 and the auxiliary capacitance electrode 120 are formed.

Figure 10D:
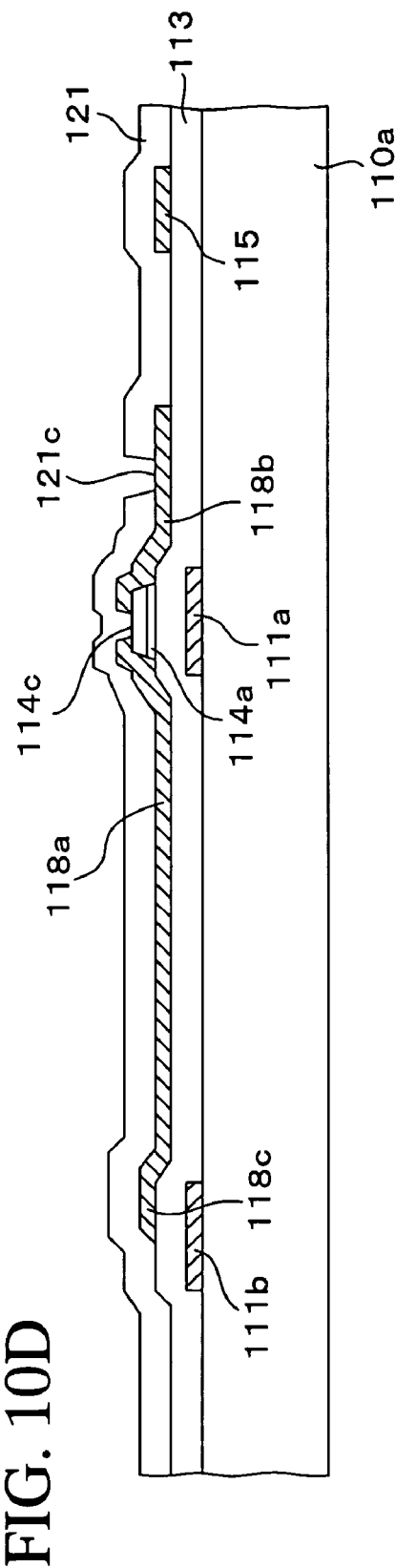

Thereafter, as shown in FIG. 10D, the second insulating film 121 made, for example, of $SiO_2$, SiN or resin is formed on the entire upper surface of the resultant glass substrate 110a. Subsequently, the contact holes 121a, 121b and 121c are formed in the second insulating film 121 by means of the photolithography method. The contact hole 121a reaches the source electrode 117b of the TFT 117. The contact hole 121b reaches the auxiliary capacitance electrode 120. The contact hole 121c reaches the source electrode 118b of the TFT 118.

Figure 10E:
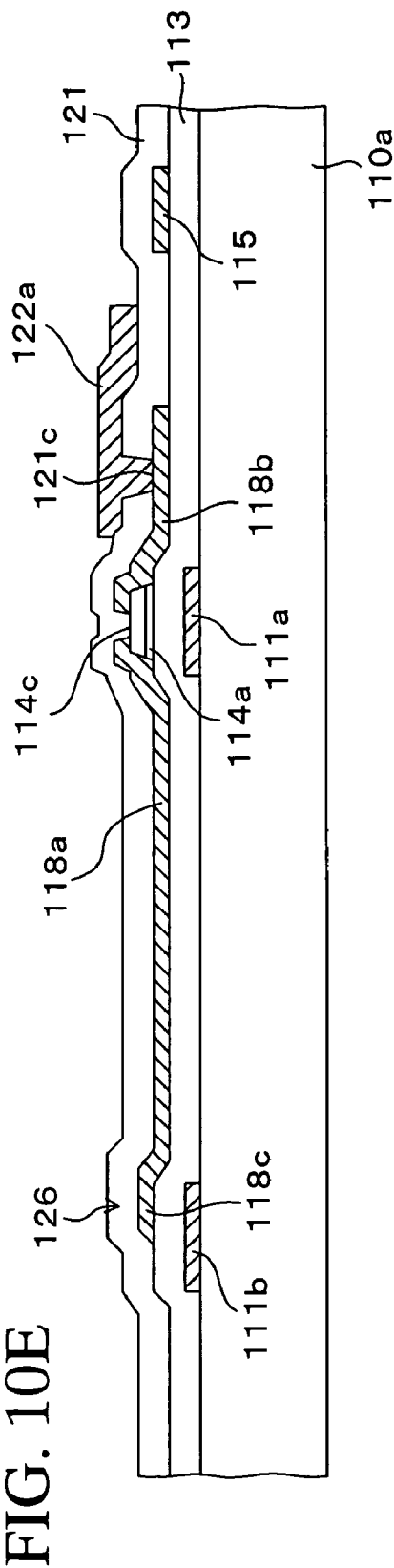

Thereafter, the ITO film (or another electric conductor film) is formed on the entire upper surface of the resultant glass substrate 110a by means of the sputtering method. Subsequently, the ITO film is patterned by the photolithography method. Thus, as shown in FIGS. 7 and 10E, the sub-picture element electrodes 122a and 122b are formed. The sub-picture element electrode 122a is electrically connected to the source electrode 117b of the TFT 117 and the source electrodes 118b of the TFT 118 respectively through the contact holes 121a and 121c. In addition, the sub-picture element electrode 122b is electrically connected to the auxiliary capacitance electrode 120 through the contact hole 121b.

Thereafter, for example, polyimide is applied to the entire upper surface of the resultant glass substrate 110a. Thus, the vertical alignment film 125 to cover the surfaces respectively of the sub-picture element electrodes 122a and 122b are formed. Thereby, the TFT substrate 110 is completed.

Next, descriptions will be provided for a method of manufacturing the facing substrate 130 with reference to FIG. 8. First of all, the black matrixes 131 are formed of a metal such as Cr or a black resin on the glass substrate 130a (on the lower surface thereof in FIG. 8) which serves as the base of the facing substrate 130. These black matrixes 131 are formed in positions opposite to the gate bus line 111, the data bus line 115 and the TFTs 116, 117 and 118, on the TFT substrate 110. The width of each of these black matrixes 131 is slightly wider than those respectively of the gate bus line 111 and the data bus line 115.

Subsequently, the color filters 132 are formed of red, green and blue photosensitive resins on the resultant glass substrate 130a. One color filter 132 with any one of red, green and blue is arranged in each picture element area.

Thereafter, the common electrode 133 made of an electrical conductor such as ITO is formed on the color filter 132 (on the lower surface thereof in FIG. 8) by means of the sputtering method. Subsequently, photoresist is applied to the top of the common electrode 133. Thus, a photoresist film is formed. This photoresist film is exposed by means of a predetermined exposure mask, and thereafter is caused to undergo the development process. Thus, the protrusions 134 are formed.

Subsequently, for example, polyimide is applied to the entire upper surface of the resultant glass substrate 130a. The vertical alignment film 135 to cover the surfaces respectively of the common electrode 133 and the protrusions 134 is formed. Thereby, the facing substrate 130 is completed.

The TFT substrate 110 and the facing substrate 130 which have been manufactured in such a manner are arranged opposite to each other with spacers (not illustrated) interposed in between, and the liquid crystal 140 is filled in the interstice between the substrates. The dielectric anisotropy of the liquid crystal 140 is negative. Subsequently, the polarizers 141a and 141b are joined to the two sides of the liquid crystal panel 140, and a drive circuit and the backlight (not illustrated) are additionally attached thereto. Thus, the liquid crystal display device according to this embodiment is completed.

Second Embodiment

Figure 11:
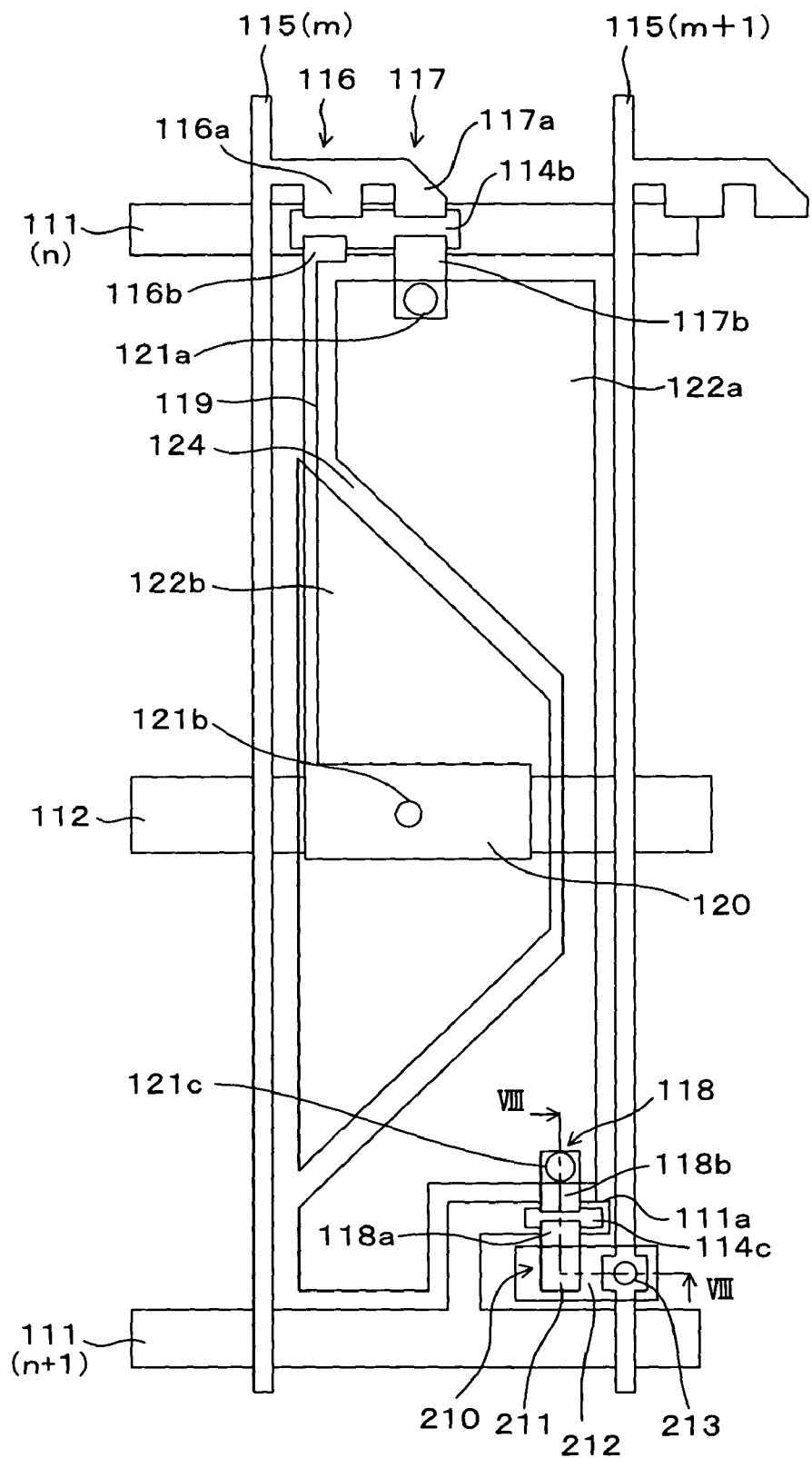
FIG. 11 is a plan view of a liquid crystal display device according to a second embodiment of the present invention.
Figure 12:
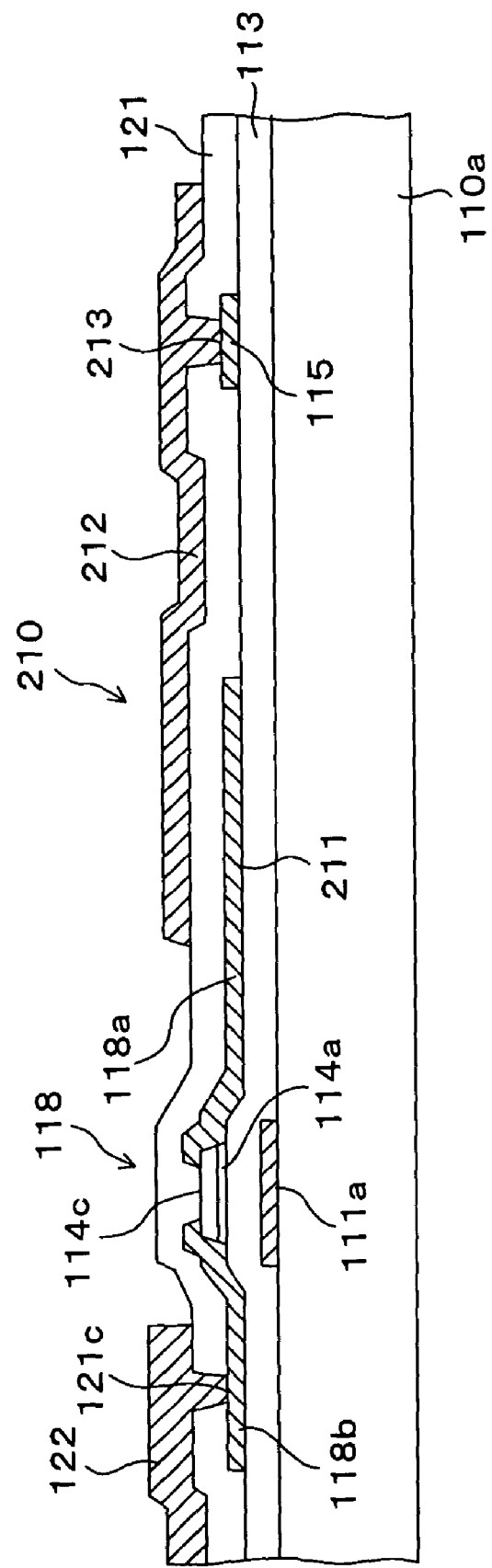
FIG. 12 is a cross-sectional view of the liquid crystal display device taken along the VIII-VIII line of FIG. 11.

FIG. 11 is a plan view showing a liquid crystal display device according to a second embodiment of the present invention. FIG. 12 is a cross-sectional view of the liquid crystal display device taken along the VIII-VIII line of FIG. 11. Incidentally, what makes this embodiment different from the first embodiment is the difference between the structures of the buffer capacitances respectively according to the two embodiments. The rest of the configuration according to this embodiment is basically similar to that according to the first embodiment. For this reason, in FIGS. 11 and 12, the same reference numerals will be used to denote the same or similar components as those shown in FIGS. 7 and 9, and thus the detailed descriptions will be omitted.

In the case of this embodiment, a buffer capacitance 210 is configured of a buffer capacitance lower electrode 211, a buffer capacitance upper electrode 212 and a second insulating film 121. The buffer capacitance lower electrode 211 and a drain electrode 118a of a TFT 118 are formed integrally. The buffer capacitance upper electrode 212 is formed at the same time as sub-picture element electrodes 122a and 122b are formed, and is made of a transparent electric conductor such as ITO. The second insulating film 121 is interposed between the buffer capacitance lower electrode 211 and the buffer capacitance upper electrode 212. The buffer capacitance upper electrode 212 is connected to a (m+1)th data bus line 115 through a contact hole 213 made in the second insulting film 121.

Descriptions will be provided below for the liquid crystal display device according to this embodiment. It should be noted that there are various methods, including the following methods, for driving the liquid crystal display device. For example, one method is that of supplying display signals each having the same polarity to picture elements arranged in the same row in the horizontal direction and supplying display signals each having an alternating polarity to picture elements neighboring in the vertical direction as shown in FIG. 13A. The other method is that of supplying the display signals each having an alternating polarity to picture elements neighboring in the horizontal and vertical directions, as shown in FIG. 13B. In addition, usually, the polarities of the display signals to be supplied respectively to the picture elements are alternated for each frame, as shown in FIGS. 13A and 13B. In the case of this embodiment, it is supposed that, as shown in FIG. 13A, the display signals each having the same polarity are supplied to the picture element arranged in the same row in the horizontal direction, and that the display signals each having the alternating polarity are supplied to the picture elements neighboring in the vertical direction.

In the case of the liquid crystal display device according to this embodiment, when a scanning signal supplied to an nth gate bus line 111 becomes active, the TFTs 116 and 117 are turned on as in the case of the first embodiment. Thus, a display signal supplied to an mth data bus line 115 is transferred to an auxiliary capacitance electrode 120 and the sub-picture element electrodes 122a and 122b. In this respect, it is supposed that the display signal with the positive polarity is supplied to the mth data bus line 115.

Thereafter, when the scanning signal becomes inactive and thus the TFTs 116 and 117 are turned off, voltage with the positive polarity depending on the display signal is held in the sub-picture element electrodes 122a and 122b.

Subsequently, when a scanning signal supplied to the (n+1)th gate bus line 111 becomes active, the TFT 118 is turned on. At this time, a display signal with the negative polarity is supplied to the (m+1)th data bus line 115. For this reason, an electric charge accumulated in the sub-picture element electrode 122a flows to the data bus line 115 through the TFT 118 and the buffer capacitance 210, and the voltage held in the sub-picture element electrode 122a drops slightly. As a result, two domains which are different from each other in T-V characteristic are present in the single picture element, as in the case of the foregoing HT method. Accordingly, this inhibits a phenomenon in which the screen looks whitish when the screen is looked at in a diagonal direction (wash-out).

It should be noted that an amount of the voltage drop in the sub-picture element electrode 122a depends on the capacitance value of the buffer capacitance 210 and the voltage of the display signal supplied to the (m+1)th data bus line 115.

In the case of this embodiment, as well, the TFTs 116 and 117 are turned on in each frame, and both of the sub-picture element electrodes 122a and 122b are electrically connected to the data bus line 115, as in the case of the first embodiment. For this reason, an electric charge flows to the data bus line 115 through the TFTs 116 and 117, and thus the image sticking is avoided. The electric charge is an direct-current component which has been accumulated in each of the sub-picture element electrode 122a and 122b by the signals supplied respectively to the gate bus line 111 and the data bus line 115 while the TFTs 116 and 117 are off. Moreover, the liquid crystal display device according to this embodiment has an effect that display unevenness stemming from the photolithography step is inhibited from occurring in comparison with the conventional type of liquid crystal display device shown in FIG. 2, as in the case of the first embodiment. In addition, the liquid crystal display device according to this embodiment has an effect that an aperture ratio is larger and accordingly a brighter display can be made, as in the case of the first embodiment.

With regard to this embodiment, the foregoing descriptions have been provided for the case where the buffer capacitance upper electrode 212 and the (m+1)th gate bus line 115 are electrically connected to each other through the contact hole 213. However, the buffer capacitance upper electrode 212 and the (m+1)th gate bus line 115 may be capacitance-coupled to each other.

In addition, in a case where, as shown in FIG. 13B, display signals with the alternating polarities are supplied respectively to picture elements neighboring in the vertical and horizontal directions, it suffices that the buffer capacitance upper electrode 212 is connected to the mth data bus line 115.

Figure 14:
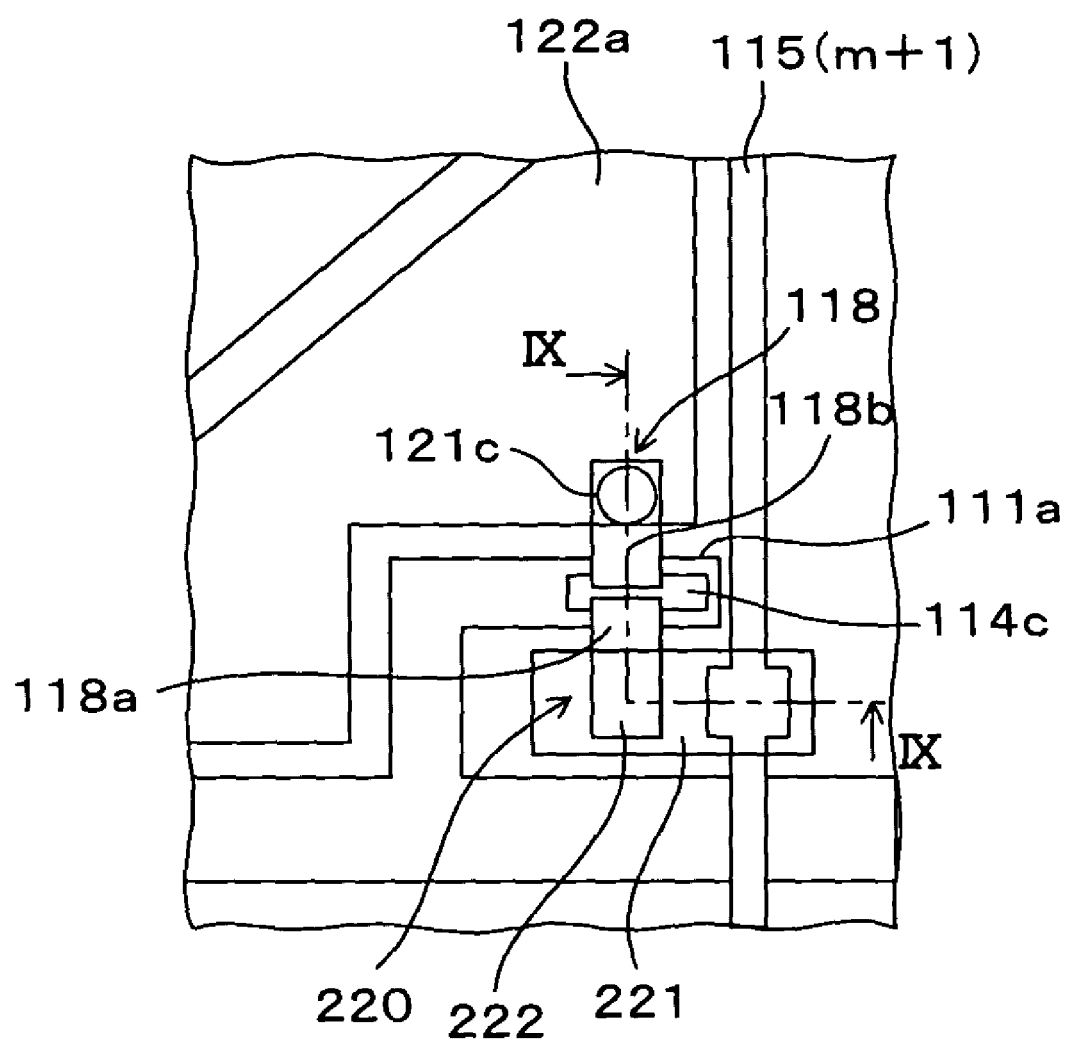
FIG. 14 is a plan view showing a modified example of the second embodiment.
Figure 15:
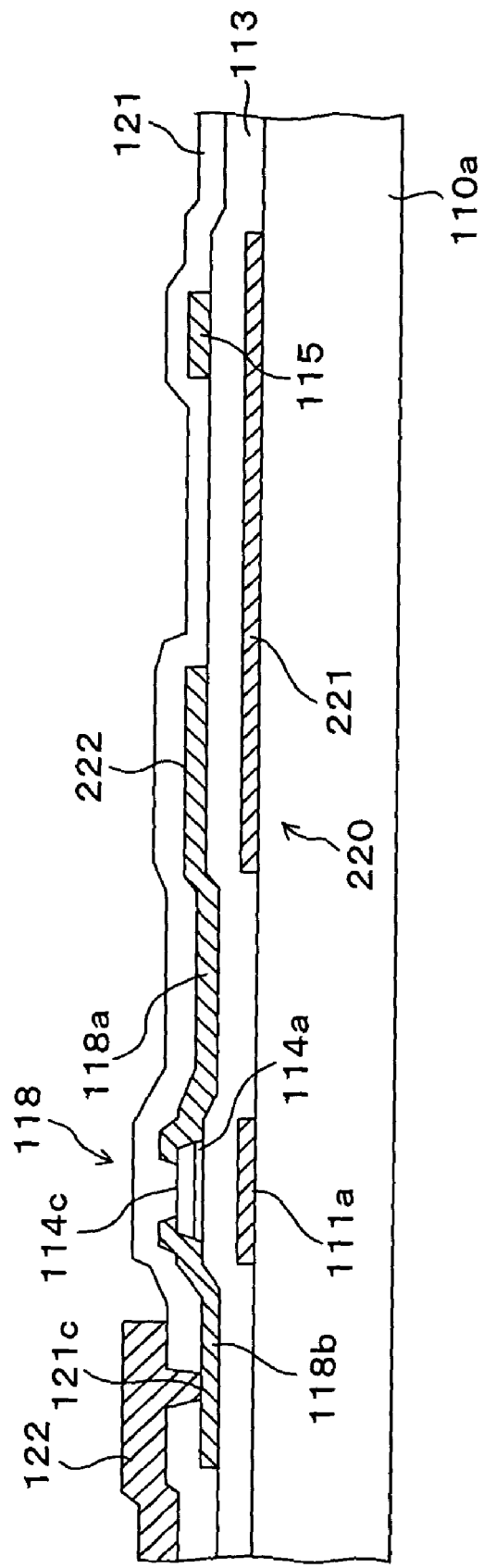
FIG. 15 is a cross-sectional view of the modified example taken along the IX-IX line of FIG. 14.

FIG. 14 is a plan view of the liquid crystal display device, and FIG. 15 is a cross-sectional view of the liquid crystal display device taken along the IX-IX line of FIG. 14. It does not matter that, as shown in FIGS. 14 and 15, a lower electrode 221 of a buffer capacitance 220 is formed at the same time as the gate bus line 111 and the interconnect 111a are formed and an upper electrode 222 and the drain electrode 118b of the TFT 118 are formed integrally. In this case, the buffer capacitance 220 is configured of the lower electrode 221, the upper electrode 222, and the first insulating film 113 in between. FIGS. 14 and 15 shows an example where the buffer capacitance lower electrode 221 and the (m+1)th data bus line 115 are capacitance-coupled to each other. However, the buffer capacitance lower electrode 221 and the (m+1)the data bus line 115 may be directly electrically connected to each other through a contact hole.

Third Embodiment

Figure 16:
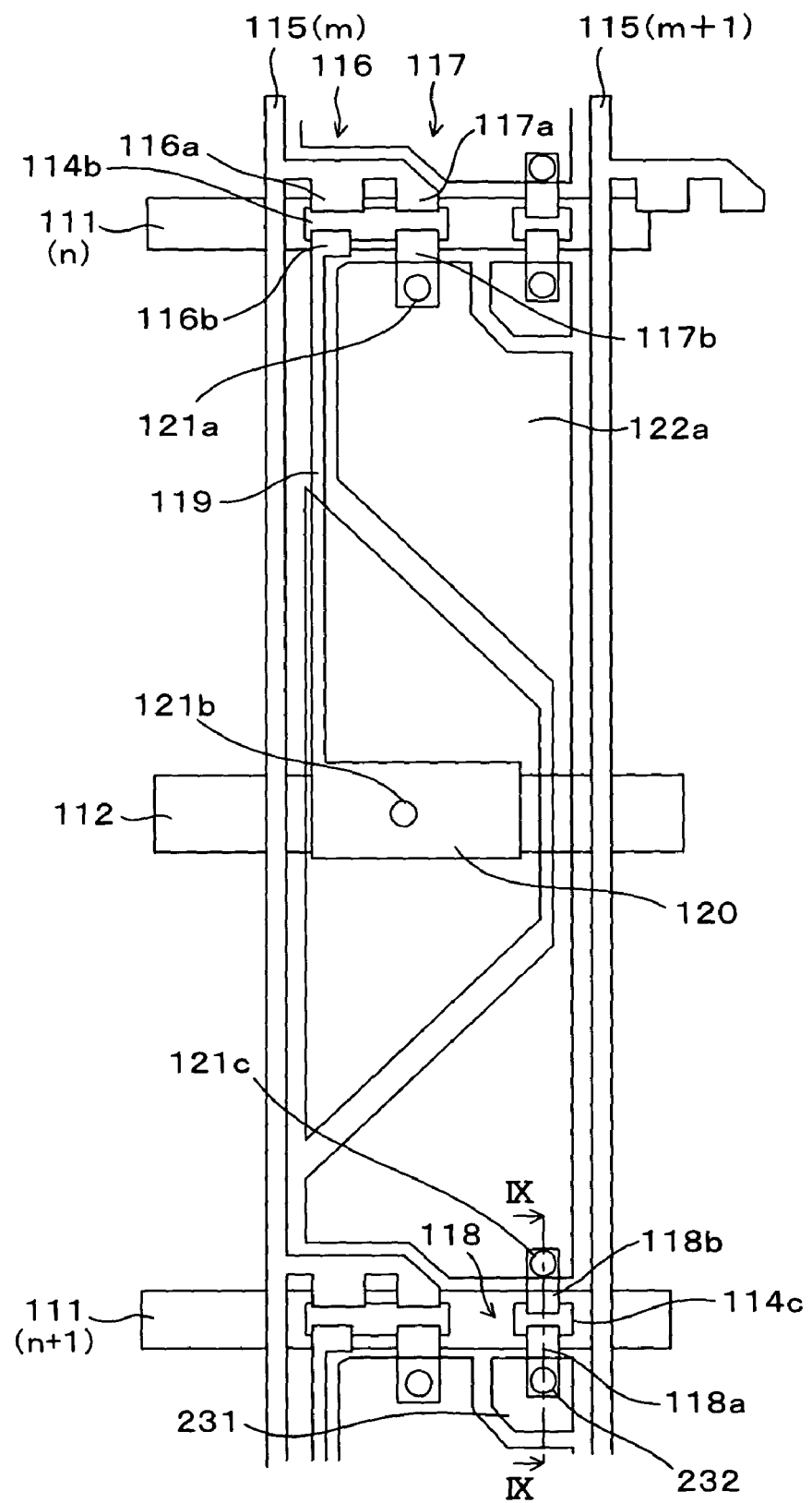
FIG. 16 is a plan view showing a liquid crystal display device according to a third embodiment of the present invention.
Figure 17:
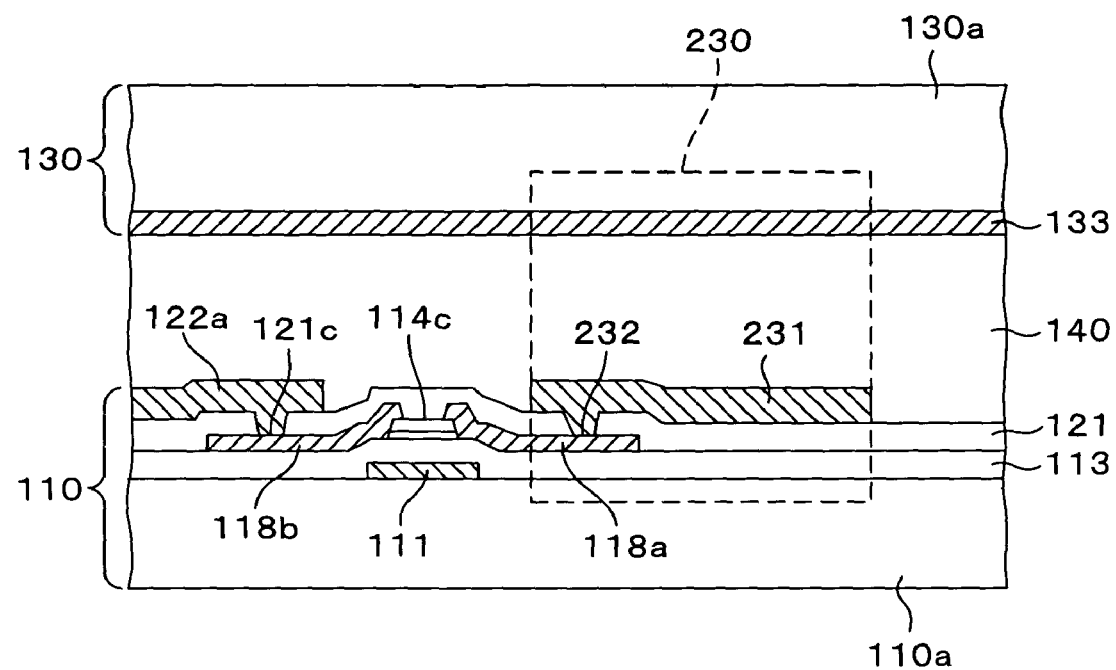
FIG. 17 is a cross-sectional view of the liquid crystal display device taken along the IX-IX line of FIG. 16.

FIG. 16 is a plan view of a liquid crystal display device according to a third embodiment. FIG. 17 is a cross-sectional view of the liquid crystal display device taken along the IX-IX line of FIG. 16. It should be noted that what makes this embodiment different from the first embodiment is the difference between the structures of the buffer capacitances respectively according to this embodiment and the first embodiment. The rest of the configuration according to this embodiment is similar to that according to the first embodiment. For this reason, in FIGS. 16 and 17, the same reference numerals are used to denote the same and similar components as those shown in FIGS. 7 and 9, and thus the detailed descriptions will be omitted. Moreover, in FIG. 7, illustrations of black matrixes, color filters, alignment films and the like are omitted as well.

In the case of this embodiment, a source electrode 118a and a drain electrode 118b of a TFT 118 are arranged respectively in positions opposite to each other with a (n+1)th gate bus line 111 interposed in between. In addition, the source electrode 118a of the TFT 118 is electrically connected to a buffer capacitance electrode 231 arranged in a picture element area in a (n+1)th column through a contact hole 232 made in a second insulating film 121. This buffer capacitance electrode 231 is formed of a transparent electrical conductor such as ITO at the same time as sub-picture element electrodes 122a and 122b are formed. In the case of this embodiment, as shown in FIG. 17, a buffer capacitance 230 is configured of the buffer capacitance electrode 231, a common electrode 133, and liquid crystal 140 in between.

Descriptions will be provided below for an operation of the liquid crystal display device according to this embodiment.

In the case of this embodiment, too, when a scanning signal supplied to an nth gate bus line 111 becomes active, TFTs 116 and 117 are turned on. Thus, a display signal supplied to an mth data bus line 115 is transferred to an auxiliary capacitance electrode 120, and sub-picture element electrodes 122a and 122b.

Subsequently, when the scanning signal becomes inactive and thus the TFTs 116 and 117 are turned off, voltage depending on the display signal is held in each of the sub-picture element electrodes 122a and 122b. Liquid crystal molecules are tilted at an angle depending on the voltage held in each of the sub-picture elements 122a and 122b. Accordingly, an amount of light depending on the tilt angle is transmitted through the picture element.

Subsequently, when the scanning signal supplied to the (n+1)th gate bus line 111 becomes active, the TFT 118 is turned on. An electric charge accumulated in the sub-picture element electrode 122a flows to a common electrode 133 through the TFT 118 and the buffer capacitance 230. Thus, the voltage held in the sub-picture element electrode 122a drops slightly. As a result, a phenomenon in which the screen looks whitish when the screen is looked at in a diagonal direction (wash-out) is inhibited, as in the case of the foregoing HT method. Incidentally, an amount of the voltage drop in the sub-picture element electrode 122a depends on the voltage of the display signal and the capacitance value of the buffer capacitance 230.

In the case of this embodiment, too, the TFTs 116 and 117 are turned on, and thus both of the sub-picture element electrodes 122a and 122b are electrically connected to the data bus line 115, as in the case of the first embodiment. For this reason, an electric charge flows to the data bus line 115 through the TFTs 116 and 117, and thus the image sticking is avoided. The electric charge is an direct-current component which has been accumulated in each of the sub-picture element electrode 122a and 122b by the signals supplied respectively to the gate bus line 111 and the data bus line 115 while the TFTs 116 and 117 are off. Moreover, the liquid crystal display device according to this embodiment has an effect that display unevenness stemming from the photolithography step is inhibited from occurring, as in the case of the first embodiment. In addition, the liquid crystal display device according to this embodiment has an effect that an aperture ratio is larger and a brighter display can be made, as in the case of the first embodiment.

What is claimed is:

1. A liquid crystal display device which is configured of first and second substrates arranged opposite to each other as well as liquid crystal filled in an interstice between the first and second substrates, and which includes a plurality of picture elements arrayed in a matrix, the liquid crystal display device comprising:

a plurality of gate bus lines for supplying scanning signals respectively to the picture elements;

a plurality of data bus lines for supplying display signals respectively to the picture elements;

first and second sub-picture element electrodes formed in each of the picture elements;

a buffer capacitance formed in each of the picture elements;

a first transistor which is driven by a scanning signal of an nth gate bus line (n is an integer), and which transfers a display signal of an mth data bus line (m is an integer) to the first sub-picture element electrode in an nth row and an mth column while the first transistor is on;

a second transistor which is driven by the scanning signal of the nth gate bus line, and which transfers the display signal of the mth data bus line to the second sub-picture element electrode in the nth row and the mth column while the second transistor is on; and a third transistor which is driven by a scanning signal of a gate bus line different from the nth gate bus line, and which transfers the scanning signal of the gate bus line different from the nth gate bus line to the first sub-picture element electrode in the nth row and the mth column through the buffer capacitance while the third transistor is on, the third transistor comprising:

a gate formed integral with the gate bus line different from the nth gate bus line, a source connected to the first sub-picture element electrode, and a drain connected to the buffer capacitance, wherein the buffer capacitance is configured of first and second capacitance electrodes, the first capacitance electrode and the gate bus line different from the nth gate bus line being formed integrally, the second capacitance electrode and the drain of the third transistor being formed integrally, and the second capacitance electrode being arranged in a position opposite to the first capacitance electrode with an insulating film interposed in between.

2. A liquid crystal display device which is configured of first and second substrates arranged opposite to each other as well as liquid crystal filled in an interstice between the first and second substrates, and which includes a plurality of picture elements arrayed in a matrix, the liquid crystal display device comprising:

a plurality of gate bus lines for supplying scanning signals respectively to the picture elements;

a plurality of data bus lines for supplying display signals respectively to the picture elements;

first and second sub-picture element electrodes formed in each of the picture elements;

a buffer capacitance formed in each of the picture elements;

a first transistor which is driven by a scanning signal of an nth gate bus line (n is an integer), and which transfers a display signal of an mth data bus line (m is an integer) to the first sub-picture element electrode in an nth row and an mth column while the first transistor is on;

a second transistor which is driven by the scanning signal of the nth gate bus line, and which transfers the display signal of the mth data bus line to the second sub-picture element electrode in the nth row and the mth column while the second transistor is on; and a third transistor which is driven by a scanning signal of a (n+1)th gate bus line, and which transfers a display signal of a (m+1)th data bus line to the first sub-picture element electrode in the nth row and the mth column through the buffer capacitance while the third transistor is on, the third transistor comprising:

a gate formed integral with the (n+1)th gate bus line, a source connected to the first sub-picture element electrode, and a drain connected to the buffer capacitance, wherein the buffer capacitance is configured of first and second capacitance electrodes, the first capacitance electrode and the drain of the third transistor being formed integrally, the second capacitance electrode being connected to the (m+1)th data bus line, and the second capacitance electrode being arranged in a position opposite to the first capacitance electrode with an insulating film interposed in between.

3. The liquid crystal display device according to claim 2, wherein the second capacitance electrode is connected to the (m+1) th data bus line through capacitance coupling.

4. A liquid crystal display device which is configured of first and second substrates arranged opposite to each other as well as liquid crystal filled in an interstice between the first and second substrates, and which includes a plurality of picture elements arrayed in a matrix, the liquid crystal display device comprising:

a plurality of gate bus lines for supplying scanning signals respectively to the picture elements;

a plurality of data bus lines for supplying display signals respectively to the picture elements;

first and second sub-picture element electrodes formed in each of the picture elements;

a buffer capacitance formed in each of the picture elements;

a first transistor which is driven by a scanning signal of an nth gate bus line (n is an integer), and which transfers a display signal of an mth data bus line (m is an integer) to the first sub-picture element electrode in an nth row and an mth column while the first transistor is on;

a second transistor which is driven by the scanning signal of the nth gate bus line, and which transfers the display signal of the mth data bus line to the second sub-picture element electrode in the nth row and the mth column while the second transistor is on; and a third transistor which is driven by a scanning signal of a (n+1)th gate bus line, and which transfers the display signal of the mth data bus line to the first sub-picture element electrode in the nth row and the mth column through the buffer capacitance while the third transistor is on, the third transistor comprising:

a gate formed integral with the (n+1)th gate bus line, a source connected to the first sub-picture element electrode, and a drain connected to the buffer capacitance, wherein the buffer capacitance is configured of first and second capacitance electrodes, the first capacitance electrode and the drain of the third transistor being formed integrally, the second capacitance electrode being connected to the mth data bus line, and the second capacitance electrode being arranged in a position opposite to the first capacitance electrode with an insulating film interposed in between.

5. The liquid crystal display device according to claim 4, wherein the second capacitance electrode is connected to the mth data bus line through capacitance coupling.

6. A liquid crystal display device which is configured of first and second substrates arranged opposite to each other as well as liquid crystal filled in an interstice between the first and second substrates, and which includes a plurality of picture elements arrayed in a matrix, the liquid crystal display device comprising:

a plurality of gate bus lines formed on the last substrate for supplying scanning signals respectively to the picture elements;

a plurality of data bus lines formed on the first substrate for supplying display signals respectively to the picture elements;

first and second sub-picture element electrodes formed on the first substrate in each of the picture elements;

a common electrode formed on the second substrate and being opposite to the first and second sub-picture element electrodes;

a buffer capacitance formed in each of the picture elements;

a first transistor which is formed on the first substrate, which is driven by a scanning signal or an nth gate bus line (n is an integer), and which transfers a display signal of an mth data bus line (m is an integer) to the first sub-picture element electrode in an nth row and an mth column while the first transistor is on;

a second transistor which is formed on the first substrate, which is driven by the scanning signal of the nth gate bus line, and which transfers the display signal of the mth data bus line to the second sub-picture element electrode in the nth row and the mth column while the second transistor is on; and a third transistor which is formed on the first substrate, and which is driven by a scanning signal of a (n+1)th gate bus line, the third transistor comprising:

a gate formed integral with the (n+l)th gate bus line, a drain connected to the first sub-picture element electrode in the nth row and the mth column, and a source connected to the buffer capacitance, wherein the buffer capacitance is configured of a capacitance electrode formed on the first substrate in a picture element next to a picture element of the nth row and the mth column and connected to the source of the third transistor, the common electrode, and liquid crystal in between.

7. The liquid crystal display device according to any one of claims 1 to 6, wherein a dielectric anisotropy of the liquid crystal is negative.

8. The liquid crystal display device according to any one of claims 1 to 6, wherein an alignment controlling structure for forming at least two domains which are different from one another in a direction in which liquid crystal molecules are tilted while voltage is being applied is formed on at least one of the first and second substrates.

* * * * *